United States Patent
Mostafa

(10) Patent No.: US 11,681,541 B2
(45) Date of Patent: Jun. 20, 2023

(54) METHODS, APPARATUS, AND ARTICLES OF MANUFACTURE TO GENERATE USAGE DEPENDENT CODE EMBEDDINGS

(71) Applicant: Intel Corporation, Santa Clara, CA (US)

(72) Inventor: Hesham Mostafa, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/555,072

(22) Filed: Dec. 17, 2021

(65) Prior Publication Data
US 2022/0107828 A1   Apr. 7, 2022

(51) Int. Cl.
G06F 9/44   (2018.01)
G06F 9/455   (2018.01)

(52) U.S. Cl.
CPC .............................. G06F 9/45529 (2013.01)

(58) Field of Classification Search
None
See application file for complete search history.

(56) References Cited

U.S. PATENT DOCUMENTS

| 11,379,220 B2* | 7/2022 | Sobran | G06F 8/75 |
| 2019/0228319 A1* | 7/2019 | Gupta | G06N 5/025 |
| 2020/0117446 A1* | 4/2020 | Smith | G06N 3/045 |
| 2021/0191696 A1 | 6/2021 | Ibarra Von Borstel et al. | |
| 2021/0240453 A1* | 8/2021 | Badlani | G06F 8/38 |
| 2022/0236971 A1* | 7/2022 | Zhang | G06F 8/36 |

OTHER PUBLICATIONS

CN 113420296, English translation (Year: 2021).*
CN 110851176, English translation (Year: 2020).*
Luan et al., "Aroma: Code Recommendation via Structural Code Search," arXiv:1812.01158v4 [cs.SE], Proc. ACM Program. Lang., vol. 3, No. OOPSLA, Article 152, Oct. 17, 2019, 28 pages.
Vaswani et al., "Attention Is All You Need," 31st Conference on Neural Information Processing Systems (NIPS 2017), 2017, 11 pages.

(Continued)

*Primary Examiner* — Insun Kang
(74) *Attorney, Agent, or Firm* — Hanley Flight & Zimmerman, LLC

(57) ABSTRACT

Methods, apparatus, systems, and articles of manufacture are disclosed to generate usage dependent code embeddings. An example apparatus includes parsing circuitry to select a usage context of a code snippet including at least one line of code (LOC) before the code snippet or an LOC at which the code snippet is called, the code snippet, and at least one LOC after the code snippet or the LOC. The example apparatus additionally includes embedding circuitry to generate a first list of token embedding vectors for first tokens of a second list of tokens for the code snippet and a third list of token embedding vectors for second tokens of a fourth list of tokens for the usage context. The example apparatus also includes concatenation circuitry to concatenate a transformed token embedding vector of a close token and a fifth list of transformed token embedding vectors for the first list.

25 Claims, 11 Drawing Sheets

(56) References Cited

OTHER PUBLICATIONS

Devlin et al., "BERT: Pre-training of Deep Bidirectional Transformers for Language Understanding," arXiv:1810.04805v2 [cs.CL], [https://doi.org/10.48550/arXiv.1810.04805], May 24, 2019, 16 pages.
Alon et al., "code2seq: Generating Sequences from Structured Representations of Code," arXiv:1808.01400v6 [cs.LG], ICLR 2019, Feb. 21, 2019, 22 pages.
Feng et al., "CodeBERT: A Pre-Trained Model for Programming and Natural Languages," arXiv:2002.08155v4 [cs.CL], [https://doi.org/10.48550/arXiv.2002.08155], Sep. 18, 2020, 12 pages.
Chen et al., "Evaluating Large Language Models Trained on Code," arXiv:2107.03374v2 [cs.LG], [https://doi.org/10.48550/arXiv.2107.03374], Jul. 14, 2021, 35 pages.
GitHub, "GitHub Copilot—Your AI Pair Programmer," GitHub Inc., [https://copilot.github.com] retrieved on Nov. 17, 2021, 15 pages.
Yasunaga et al., "Graph-based, Self-Supervised Program Repair from Diagnostic Feedback," arXiv:2005.10636v2 [cs.SE], Proceedings of the 37th International Conference on Machine Learning, Jun. 30, 2020, 10 pages.
Guo et al., "GraphCodeBERT: Pre-training Code Representations with Data Flow," arXiv:2009.08366v4 [cs.SE], ICLR 2021, Sep. 13, 2021, 18 pages.
Friedman, "Introducing GitHub Copilot: Your AI Pair Programmer," The GitHub Blog, GitHub Inc., Jun. 29, 2021, [https://github.blog/2021-06-29-introducing-github-copilot-ai-pair-programmer/] retrieved on Nov. 17, 2021, 4 ages.
Hochreiter et al., "Long Short-Term Memory," Massachusetts Institute of Technology, Neural Computation 9, 1997, 46 pages.
Ye et al., "Misim: A Neural Code Semantics Similarity System Using the Context-Aware Semantics Structure," airXiv:2006.05265v6 [cs.LG], [https://doi.org/10.48550/arXiv.2006.05265], Jun. 2, 2021, 22 pages.
Ben-Nun et al., "Neural Code Comprehension: A Learnable Representation of Code Semantics," arXiv:1806.07336v3 [cs.LG], 32nd Conference on Neural Information Processing Systems (NeurIPS 2018), Nov. 29, 2018, 17 pages.
Wikipedia "Self-Supervised Learning," Wikipedia Foundation, Inc., Nov. 11, 2021, [https://en.wikipedia.org/w/index.php?title=Self-supervised_learning&oldid=1054652741] retrieved on Nov. 24, 2021, 5 pages.
Wikipedia "Seq2seq," Wikipedia Foundation, Inc., Aug. 26, 2021, [https://en.wikipedia.org/w/index.php?title=Seq2seq&oldid=1040704535] retrieved on Nov. 24, 2021, 3 pages.
Gottschlich et al., "The Three Pillars of Machine Programming," arXiv:1803.07244v3 [cs.AI], [https://doi.org/10.48550/arXiv.1803.07244], Jun. 26, 2021, 11 pages.
Bouchard, "What is Self-Supervised Learning? | Will machines ever be able to team like humans?," Medium, May 27, 2020, [https://medium.com/what-is-artificial-intelligence/what-is-self-supervised-learning-will-machines-be-able-to-learn-like-humans-d9160f40cdd1] retrieved Nov. 24, 2021, 11 pages.
Panthaplackel et al., "Associating Natural Language Comment and Source Code Entities," arXiv:1912.06728v1 [cs.CL], [https://doi.org/10.48550/arXiv.1912.06728], Dec. 13, 2019, 10 pages.
Li et al., "Fuzzy Neural Intelligent Systems: Mathematical Foundation and the Applications in Engineering—Chapter 15: Data Processing," CRC Press, Oct. 31, 2018, 12 pages.
Bushaev, "Adam—latest trends in deep learning optimization," Towards Data Science, Oct. 22, 2018, [https://towardsdatascience.com/adam-latest-trends-in-deep-learning-optimization-6be9a291375c] retrieved on Nov. 13, 2020, 26 pages.
Chen et al., "Automatically detecting the scopes of source code comments," Elsevier Inc., The Journal of Systemse and Software, vol. 153, Mar. 12, 2019, 19 pages.
Wikipedia "Bayesian Network," Wikipedia Foundation, Inc., Oct. 21, 2020, [https://en.wikipedia.org/w/index.php?title=Bayesian_network&oldid=984764969] retrieved on Oct. 26, 2020, 17 pages.
Maddox, "Bayesian Neural Networks: A Tutorial," NYU, [https://wjmaddox.github.io/assets/BNN_tutorial_CILVR.pdf] retrieved on Oct. 26, 2020, 83 pages.
Wikipedia, "Code Reuse," Wikipedia Foundation, Inc., Oct. 29, 2020, [https://en.wikipedia.org/w/index.php?title=Code_reuse&oldid=985974967] retrieved on Nov. 3, 2020, 7 pages.
Neo4j, "Cypher Query Language—Neo4j Graph Database Platform," Neo4j, Inc., [https://neo4j.com/developer/cypher/] retrieved on Oct. 27, 2020, 9 pages.
Wikipedia, "Graph Database," Wikipedia Foundation, Inc., Oct. 25, 2020, [https://en.wikipedia.org/w/index.php?title=Graph_database&oldid=985414485] retrieved on Nov. 3, 2020, 15 pages.
Omid et al., "How to Determine the Appropriate Pre-Processing Technique for Artificial Neural Networks (ANNs)?," ResearchGate GmbH., Nov. 15, 2013, [https://www.researchgate.net/post/How-to-determine-the-appropriate-pre-processing-technique-for-arlilicial-neural-networks-ANNs] retrieved on Oct. 26, 2020, 11 pages.
Wikipedia, "Lexical Analysis," Wikipedia Foundation, Inc., Oct. 26, 2020, [https://en.wikipedia.org/w/index.php?title-Lexical_analysis&oldid-985459214] retrieved on Nov. 3, 2020, 11 pages.
Chopra, "Making Your Neural Network Say 'I Don't Know'—Bayesian NNs using Pyro and PyTorch," Towards Data Science, Nov. 27, 2018, [https://towardsdatascience.com/making-your-neural-network-say-i-dont-know-bayesian-nns-using-pyro-and-pytorch-b1c24e6ab8cd] retrieved on Oct. 26, 2020, 29 pages.
Neo4j, "Neo4j Graph Platform—Neo4j Graph Database Platform," Neo4j, Inc., [https://neo4j.com/developer/graph-platform/] retrieved on Oct. 27, 2020, 5 pages.
No4j, "Neo4j Python Driver 4.1—Neo4j Python Driver 4.1," Neo4j, Inc., [https/neo4j.com/docs/api/python-driver/current/] retrieved on Oct. 28, 2020, 4 pages.
Facebooj AI, "Neural Code Search: ML-based code search using natural language queries," Facebook AI, Jun. 24, 2019, [https://ai.facebook.com/blog/neural-code-search-ml-based-code-search-using-natural-language-queries/] retrieved on Oct. 26, 2020, 24 pages.
Neo4j, "Neo4j Graph Database—Neo4j Graph Database Platform," Neo4j, Inc., [https://neo4j.com/developer/neo4j-database/] retrieved on Oct. 27, 2020, 9 pages.
Iyer et al., "Learning a Neural Semantic Parser from User Feedback," Association for Computational Linguistics, Proceedings of the 55th Annual Meeting of the Association for Computational Linguistics, Jul. 30-Aug. 4, 2017, 11 pages.
Lei et al., "From Natural Language Specifications to Program Input Parsers," Association for Computational Linguistics, Proceedings of the 51st Annual Meeting of the Association for Computational Linguistics, vol. 1: Long Papers. Aug. 2013, 10 pages.
Yaghmazadeh et al., "SQLizer: Query Synthesis from Natural Language," ACM, Proc. ACM Program. Lang., vol. 1, No. OOPSLA, Article 63, Oct. 2017, 26 pages.

\* cited by examiner

METHODS, APPARATUS, AND ARTICLES OF MANUFACTURE TO GENERATE USAGE DEPENDENT CODE EMBEDDINGS

FIELD OF THE DISCLOSURE

This disclosure relates generally to language processing and, more particularly, to methods, apparatus, and articles of manufacture to generate usage dependent code embeddings.

BACKGROUND

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For example, the model may be trained with data to recognize patterns and/or associations and follow such patterns and/or associations when processing input data such that other input(s) result in output(s) consistent with the recognized patterns and/or associations.

As AI has advanced, developers have applied AI to many different fields. One field of application for AI is code intelligence tasks. For example, AI can be used for automatic code captioning, code clone detection, code completion, etc. To aid in code intelligence task, AI models utilize code embeddings. A code embedding refers to one or more vectors that capture information in a piece of code. DL models may require the input vector(s) to be a real-valued vector (e.g., a vector of real numbers). As such, many code embeddings include one or more fixed-size real-valued vectors that capture information in a piece of code.

Figure 1:
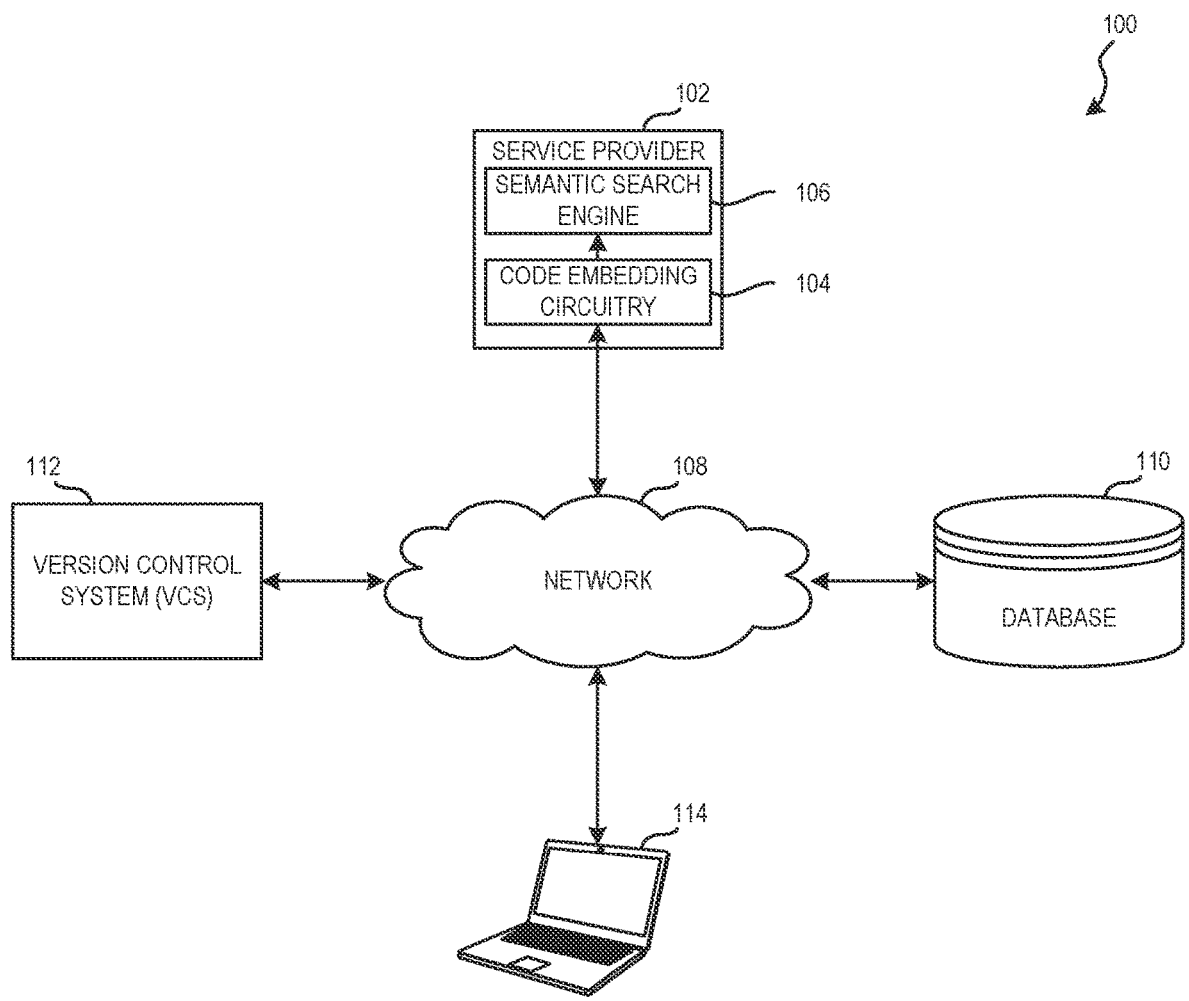
FIG. 1 is a network diagram including an example service provider having example code embedding circuitry and an example semantic search engine.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Code intelligence tasks (e.g., automatic code captioning, code clone detection, code completion, etc.) depend on high-quality code embeddings. For example, when training AI-based models (e.g., neural networks (NNs)) to perform code intelligence tasks, these AI-based models may expect real-valued code embeddings as an input. To generate one or more code embeddings, code embedding circuitry processes input code as described further herein. After generating one or more code embeddings, the code embedding circuitry provides the one or more code embeddings to one or more downstream AI/ML models that implement the code intelligence tasks.

As described above, code intelligence tasks include clone detection, code summarization, and code repair. Clone detection refers to detecting whether two code snippets implement the same function. For example, a user may input a code snippet to a code intelligence system (e.g., one or more AI/ML models) to determine whether the code snippet implements the same function as any code indexed in the code intelligence system. Clone detection is useful in situations where a user has requested the code intelligence system to recommend alternative implementations of the same functionality of an input code snippet. Thus, clone detection can help a developer identify bugs and/or find a more efficient implementation of a code snippet.

Code summarization refers to generating a natural language description of the functionality of an input code snippet. Generating such a natural language description reduces the code documentation effort and makes understanding legacy uncommented code easier by commenting the code. Code repair refers to modifying an input code snippet to fix functional and/or syntactic bugs in the input code snippet. The downstream AI/ML model(s) repair(s) the input code snippet and output(s) (e.g., emit(s)) the repaired version of the input code snippet (e.g., to a user).

This is not an exhaustive list of code intelligence tasks. Many code intelligence tasks depend on high-quality code embeddings as input. The quality of a code embedding strongly affects the performance of a downstream AI/ML model implementing a code intelligence task. Accordingly, examples disclosed herein include code embedding circuitry that captures relevant high-level semantic information associated with an input code snippet.

Existing code embedding techniques generally fall into two categories, embeddings constructed from structural code representations and embeddings constructed from code text. Structural techniques construct an intermediate graph-based representation of the input code, then generate code embedding using the structural representation. The structural representation can be purely syntactic (e.g., the structural representation reflects the arrangement of text tokens in the code). For example, the AROMA system extracts hand-designed features from a syntactic code representation to construct code embeddings that are then used to measure the similarity between two pieces of code, while code2seq models use a standard tree-like representation of the code called abstract syntax tree and construct the embeddings using random paths in the tree. Structural representations can also include semantic information which could, for example, indicate that the parenthesis tokens "(" and ")" in one line of code (LOC) (e.g., in the LOC: Z=find max(arr)) imply a function call while the parenthesis tokens in another LOC (e.g., in the LOC: C=(A+B)*2) indicate a mathematical grouping and/or precedence. The MISIM technique constructs code embeddings using a structural code representation with a rich and customizable semantic structure, while contextual flow graphs (XFG) make use of data and control flow information to enrich the structural representation. Semantic-based structural representations lead to higher-quality embeddings as evidenced by the improved performance of downstream code intelligence tasks built on top of these embeddings.

Embedding techniques that construct embeddings from code text include techniques like CodeBERT that construct code embeddings directly from the code text without using any intermediate structural representation. Existing techniques for extracting code embeddings are trainable techniques (e.g., existing techniques include free parameters that are tuned using several optimization and/or training iterations to improve the quality of the generated embeddings). The embedding optimization objective can be a self-supervised objective (e.g., the embedding optimization objective does not depend on any downstream task) or a supervised objective that depends on a particular downstream task.

Existing embedding technique do not consider the context in which a code snippet is used. By failing to consider context, existing techniques miss potentially relevant information included in usages context(s) of a code snippet. While theoretically the body of a function (e.g., the function body) could be enough for an expert programmer to infer the type of possible function arguments, the usage context provides a more easily accessible source of information regarding the arguments of a function. This source of information is not used by existing techniques. Additionally, when embedding a code snippet, existing techniques cannot improve embeddings over time as programmers use the code snippet.

Conversely, examples disclosed herein utilize a growing number of usage contexts to improve code embedding. Examples disclosed herein include methods, apparatus, and articles of manufacture to generate usage dependent code embeddings. While existing code embedding methods only consider a code snippet being embedded, examples disclosed herein consider the context in which the code snippet is used and/or called. By considering the context, examples disclosed herein result in higher quality code embeddings and as such, improve performance of a wide range of code intelligence tools. The context in which a code snippet is used and/or called is referred to as a usage context of the code snippet. As used herein, a usage context of a code snippet refers to one or more lines of code (LOCs) surrounding (e.g., before and/or after) the LOC or LOCs where the code snippet is used and/or called and the LOC or LOCs where the code snippet is used and/or called. When the code snippet is a function, the usage context includes the LOCs around the LOC at which the function is called and the LOC at which the function is called. If the code snippet is utilized multiple times in input code, then examples disclosed herein select multiple usage contexts for the code snippet.

FIG. 1 is a network diagram 100 including an example service provider 102 having example code embedding circuitry 104 and an example semantic search engine 106. The network diagram 100 includes the example service provider 102, an example network 108, an example database 110, an example version control system (VCS) 112, and an example user device 114. In the example of FIG. 1, the example service provider 102, the example database 110, the example VCS 112, the example user device 114, and/or one or more additional devices are communicatively coupled via the example network 108.

In the illustrated example of FIG. 1, the service provider 102 is implemented by processor circuitry. For example, the service provider 102 is implemented by one or more servers executing one or more trained AI-based models (e.g., ML models, NNs, DL models, etc.) and/or instantiating and/or executing instructions to implement peripheral components to the one or more AI-based models. As described above, the service provider 102 includes the code embedding circuitry 104 and the semantic search engine 106. In some examples, the service provider 102 includes interface circuitry to obtain code including a code snippet to be processed by an AI/ML model (e.g., the semantic search engine 106) and/or to return results generated by the AI/ML model (e.g., the semantic search engine 106).

In the illustrated example of FIG. 1, the service provider 102 offers one or more services and/or products to end-users. For example, the service provider 102 provides one or more trained models for download, hosts a web-interface through which a user may access the one or more models, among others. The one or more models provided by the service provider 102 may include one or more models that implement the code embedding circuitry 104 and/or one or more models that implement the semantic search engine 106. In some examples, the service provider 102 provides end-users with a plugin that implements the code embedding circuitry 104 and/or the semantic search engine 106. In this manner, the end-user can implement the code embedding circuitry 104 and/or the semantic search engine 106 locally (e.g., at the user device 114).

In some examples, an end-user can implement the code embedding circuitry 104 and/or the semantic search engine 106 as a plugin to an integrated development environment (IDE) installed on the user device 114. In some examples, instructions to implement the code embedding circuitry 104 and/or the semantic search engine 106 may be included in an IDE. In such examples, when an end-user purchases, leases, or otherwise obtains the IDE from a developer of the IDE, the end-user also obtains the instructions to implement the code embedding circuitry 104 and/or the semantic search engine 106. Additionally or alternatively, the VCS 112 may implement the code embedding circuitry 104 and/or the semantic search engine 106. In such an example, an end-user accessing the VCS 112 (e.g., via the user device 114) may utilize the functionality of the code embedding circuitry 104 and/or the semantic search engine 106 when editing code maintained by the VCS 112.

In the illustrated example of FIG. 1, the code embedding circuitry 104 is implemented by processor circuitry that preprocesses code snippets for subsequent processing by the semantic search engine 106. The code embedding circuitry 104 is coupled to the semantic search engine 106 and/or the network 108 (e.g., via a wired and/or wireless connection). Given a code snippet to embed for further processing by an AI/ML model (e.g., implemented by the semantic search engine 106), the code embedding circuitry 104 samples the usage context of the code snippet within a larger body of code. The code snippet may be a function (e.g., the body of a function) or code that is written in the body of a program. The code embedding circuitry 104 then executes and/or instantiates an embedding procedure (further described below) on the usage context of the code snippet to generate a usage dependent code embedding. The code embedding circuitry 104 forwards one or more usage dependent code embeddings to the semantic search engine 106 which performs one or more code intelligence tasks.

In the illustrated example of FIG. 1, the code embedding circuitry 104 samples the code snippet (e.g., code written in the body of a program or a function) and usage contexts of other instances of the code snippet or usage contexts of LOCs calling the function when the code snippet is a function. The code embedding circuitry 104 executes and/or instantiates the embedding procedure on the code snippet, the usage context(s) of the code snippet, and/or the usage context(s) of LOCs calling the code snippet (when the code snippet is a function) to generate a usage dependent code embedding. The code embedding circuitry 104 forwards one or more usage dependent code embeddings to the semantic search engine 106. Example usage contexts disclosed herein advantageously provide additional information about the code snippet to be processed including information about function arguments, information about how the output of a function is used, and/or general information about the programming context in which a function is used and/or called.

In examples disclosed herein, the code embedding circuitry 104 of FIG. 1 executes and/or instantiates one or more machine learning models and/or related circuitry to identify usage contexts for code of interest and to generate usage dependent code embeddings. In examples disclosed herein, the one or more machine learning models and/or the related circuitry are language dependent. For example, if the input code is written in C++, the code embedding circuitry 104 implements one or more machine learning models and/or related circuitry trained on C++ code. In another example, if the input code is written in Python, the code embedding circuitry 104 implements one or more machine learning models and/or related circuitry trained on Python code. In some examples, the one or more machine learning models are stored in a model data store prior to execution and/or instantiation (e.g., during deployment and/or training).

Many different types of machine learning models and/or machine learning architectures exist. In examples disclosed herein, a transformer model is used. Using a transformer model enables conversion of a vector or matrix to another vector or matrix. However, other AI-based and/or machine learning models/architectures are suitable to use in example approaches disclosed herein to convert an input sequence to an output sequence having the same number of elements as the input sequence. For example, other types of machine learning models that could additionally or alternatively be used include sequence to sequence (seq2seq) models, recurrent neural networks (RNNs), long short-term memory (LSTM) models, gate recurrent unit (GRU) models, etc.

In general, implementing a ML/AI system involves two phases, a learning/training phase and an inference phase. In the learning/training phase, a training algorithm is used to train a model to operate in accordance with patterns and/or associations based on, for example, training data. Training data is input data that has already been classified or labeled to expected output data from the machine learning model. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labeling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs). Another form of training is self-supervised training. In self-supervised training, training data is autonomously labeled (e.g., by exploiting relationships between different input signals). In self-supervised training, a model learns to predict part of an input from other parts of the input.

In examples disclosed herein, ML/AI models are trained using self-supervised training. However, any other training algorithm may additionally or alternatively be used. In examples disclosed herein, training is performed until an acceptable amount of error is achieved. For example, a portion of the training data is used to train a model and a different portion of the training data is used to test the error of the model. If the error does not satisfy (e.g., is above) a threshold, examples disclosed herein use additional training data to further train and/or tune the model until the error satisfies (e.g., is below) the threshold. In examples disclosed herein, training is performed at the service provider 102. However, in additional or alternative examples, training may be performed at the user device 114. Training is performed using hyperparameters that control how the learning is performed (e.g., a learning rate, a number of layers to be used in the machine learning model, etc.). In examples disclosed herein, hyperparameters control the learning rate and regularization. Example hyperparameters that control regularization control decay, weight fitting, or the like. Such hyperparameters are selected by, for example, grid search methods that sample many hyperparameter choices and train a different model for each hyperparameter choice, then use the best performing model at the end. In some examples retraining may be performed. Such retraining may be performed in response to the availability of new training data such as training data in a language for which one or more machine learning models have not been trained.

Training is performed using training data. In examples disclosed herein, the training data originates from any source. For example, training data may be obtained from public repositories of code (e.g., GitHub, GitLab, other open-source code repositories, etc.) such as that maintained by the database 110 and/or the VCS 112. In some examples, training data may be obtained from a repository of code that is internal to an organization. Once training is complete, the model is deployed for use as an executable and/or instantiate-able construct that processes an input and provides an output based on the network of nodes and connections defined in the model. In examples disclosed herein, the model is stored at the service provider 102 for execution and/or instantiation by the code embedding circuitry 104. In some examples, the model may be stored at the service provider 102 where it can be licensed and/or sold to end-users. For example, after sale or license, the model may be transmitted to and executed and/or instantiated by the user device 114 to implement the code embedding circuitry 104.

Once trained, the deployed model may be operated in an inference phase to process data. In the inference phase, data to be analyzed (e.g., live data) is input to the model, and the model executes and/or is instantiated to create an output. This inference phase can be thought of as the AI "thinking" to generate the output based on what it learned from the training (e.g., by executing and/or instantiating the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed and/or instantiated by a machine, etc.). For example, the output of the AI model may be processed by the semantic search engine 106 to perform code intelligence tasks.

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model (e.g., by generating a new model or tuning the previously deployed model) can be triggered using the feedback and an updated training data set, hyperparameters, etc., to generate an updated, deployed model.

In examples disclosed herein, code including a code snippet to be processed by an AI/ML model (e.g., the semantic search engine 106) and/or the code snippet may be commented code, self-documented code, uncommented code, and/or non-self-documented code. Commented code refers to code that includes many comments compared to the number of LOCs. Self-documented code refers to code that includes (a) many functions and/or variables with labels that relate to the use and/or meaning of the functions and/or variables compared to (b) the number of functions and/or variables of the code. Uncommented code refers to code that (1) does not include comments, (2) includes very few comments compared to the number of LOCs, or (3) includes comments in a convention that is unique to the developer of the code and not clearly understood by others (such as a comment that has been flagged as inaccurate and/or misleading). Non-self-documented code refers to code that (1) does not include functions and/or variables with labels that relate to the use and/or meaning of the functions and/or variables or (2) includes (a) very few functions and/or variables with labels that relate to the use and/or meaning of the functions and/or variables compared to (b) the number of functions and/or variables of the code is referred to herein as non-self-documented code.

In the illustrated example of FIG. 1, the semantic search engine 106 is implemented by processor circuitry that trains other components of the semantic search engine 106 such as one or more Bayesian neural networks (BNNs) to generate a searchable representation of the VCS 112, determine the intent of natural language (NL) queries, and/or to interpret usage dependent code embeddings of code snippets included in queries to the semantic search engine 106. In additional or alternative examples, the semantic search engine 106 can implement any other ML/AI model. After performing analysis (e.g., one or more code intelligence tasks) on the query, the semantic search engine 106 returns a result (e.g., to an end-user that submitted the query). In the example of FIG. 1, the semantic search engine 106 is coupled to the code embedding circuitry 104.

In the example of FIG. 1, the code embedding circuitry 104 uses information related to how a code snippet is practically used and/or called while generating a code embedding. As such, the output generated by the semantic search engine 106 changes as programmer(s) change(s) the way the code snippet is used in a larger program. For example, if several usage contexts of a code snippet to be embedded use the code snippet in a preferred manner (e.g., correctly), performance of the semantic search engine 106 (e.g., for code summarization and/or code repair) will improve. Additionally, in the example of FIG. 1, as the number of usage contexts of a code snippet increases in a larger program and/or code base, the quality of embeddings of the code snippet will increase resulting in improved performance of the downstream code intelligence tasks performed by the semantic search engine 106.

In some examples, the service provider 102 of FIG. 1 requests sample use cases of a code snippet before the semantic search engine 106 performs a code intelligence task (e.g., code completion, code clone detection, bug fixing, etc.) on the code snippet. For example, the service provider 102 requests sample use cases of a code snippet if the code embedding circuitry 104 and/or the semantic search engine 106 are not integrated with a code editor (e.g., an IDE, the VCS 112, etc.), but rather receive inputs as explicit code snippets provided by a user. In some examples, the service provider 102 may request that a user provide access to an entire file or access to an entire code base that includes a code snippet (e.g., code within a program and/or a function) to be processed by the code embedding circuitry 104 and/or the semantic search engine 106.

In the illustrated example of FIG. 1, the network 108 is the Internet. However, the example network 108 may be implemented using any suitable wired and/or wireless network(s) including, for example, one or more data buses, one or more Local Area Networks (LANs), one or more wireless LANs, one or more cellular networks, one or more private networks, one or more public networks, among others. In additional or alternative examples, the network 108 is an enterprise network (e.g., within businesses, corporations, etc.), a home network, among others. The example network 108 enables the service provider 102 (including the code embedding circuitry 104 and/or the semantic search engine 106), the database 110, the VCS 112, and the user device 114 to communicate.

In the illustrated example of FIG. 1, the database 110 stores data related to the VCS 112. The database 110 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The database 110 may additionally or alternatively be implemented by one or more double data rate (DDR) memories, such as DDR, DDR2, DDR3, DDR4, DDR5, mobile DDR (mDDR), DDR SDRAM, etc. The database 110 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the database 110 is illustrated as a single database, the database 110 may be implemented by any number and/or type(s) of databases. Furthermore, the data stored in the database 110 may be in any data format such as, for example, binary data, comma delimited data, tab delimited data, structured query language (SQL) structures, etc.

In some examples, the database 110 is implemented by a graph database (GDB). When implemented by a GDB, the database 110 relates data stored in the database 110 to various nodes and edges where the edges represent relationships between the nodes. The relationships allow data stored in the database 110 to be linked together such that, related data may be retrieved in a single query. In examples where the database 110 is implemented by a GDB, the database 110 may be implemented by one or more Neo4J graph databases. In additional or alternative examples where the database 110 is implemented by a GDB, the database 110 may be implemented by one or more ArangoDB graph databases, one or more OrientDB graph databases, one or more Amazon Neptune graph databases, among others. In examples where the database 110 is implemented by a GDB, suitable implementations of the database 110 will be capable of storing probability distributions of source code intents either implicitly or explicitly by means of text (e.g., string) similarity metrics.

In the illustrated example of FIG. 1, the VCS 112 is implemented by one or more computers and/or one or more memories associated with a VCS platform. In some examples, the components of the VCS 112 may be distributed (e.g., geographically diverse). In the example of FIG. 1, the VCS 112 manages changes to computer programs, websites, and/or other information collections. A user of the VCS 112 (e.g., a developer accessing the VCS 112 via the user device 114) may edit a program and/or other code managed by the VCS 112. To edit the code, the developer operates on a working copy of the latest version of the code managed by the VCS 112.

In the illustrated example of FIG. 1, when the developer would like to merge their edits with the latest version of the code at the VCS 112, the developer commits their changes with the VCS 112. The VCS 112 then updates the latest version of the code to reflect the working copy of the code across all instances of the VCS 112. In some examples, the VCS 112 may rollback a commit (e.g., when a developer would like to review a previous version of a program). Users of the VCS 112 (e.g., reviewers, other users who did not draft the code, etc.) may apply comments to code in a commit and/or send messages to the drafter of the code to review and/or otherwise improve the code in a commit.

In the illustrated example of FIG. 1, the VCS 112 is implemented by one or more computers and/or one or more memories associated with the Git platform. In additional or alternative examples, the one or more computers and/or one or more memories that implement the VCS 112 may be associated with another VCS platform such as AWS Code-Commit, Microsoft Team Foundation Server, Gerrit Code Review, Subversion, among others.

As described above, in some examples, the VCS 112 of FIG. 1 may implement the code embedding circuitry 104 and/or the semantic search engine 106. In such examples, while a user edits code using the VCS 112, the code embedding circuitry 104 and/or the semantic search engine 106 may process the code to provide suggestions to the user. Additionally or alternatively in such examples, a user may select a code snippet (e.g., by highlighting the code snippet, by copying and pasting the code snippet into a search field of a graphical user interface (GUI), by selecting a file and/or code base including the code snippet, etc.) for the code embedding circuitry 104 and/or the semantic search engine 106 to process.

In the illustrated example of FIG. 1, the user device 114 is implemented by a laptop computer. In additional or alternative examples, the user device 114 can be implemented by a mobile phone, a tablet computer, a desktop computer, a server, among others, including one or more analog or digital circuit(s), logic circuits, programmable processor(s), programmable controller(s), GPU(s), DSP(s), ASIC(s), programmable logic device(s) (PLD(s)), and/or field programmable logic device(s) (FPLD(s)). The user device 114 can additionally or alternatively be implemented by a CPU, GPU, an accelerator, a heterogeneous system, among others.

In the illustrated example of FIG. 1, the user device 114 subscribes to, purchases, and/or leases a product and/or service from the service provider 102 to access one or more machine learning models trained to model a VCS, identify the intent of NL queries, return code snippets retrieved from a database based on the intent of the NL queries, process queries including uncommented and/or non-self-documented code snippets, and return intents of the code snippets and/or related VCS commits.

For example, the user device 114 of FIG. 1 accesses the one or more trained models by downloading the one or more models from the service provider 102, accessing a web-interface hosted by the service provider 102 and/or another device, among other techniques. In some examples, the user device 114 installs a plugin to implement a machine learning application. In such examples, the plugin implements the code embedding circuitry 104 and/or the semantic search engine 106. In some examples, the user device 114 may access the code embedding circuitry 104 and/or the semantic search engine 106 via the VCS 112 as described above. The user device 114 may access the VCS 112 via a web interface, via an application, or the like.

Figure 2:
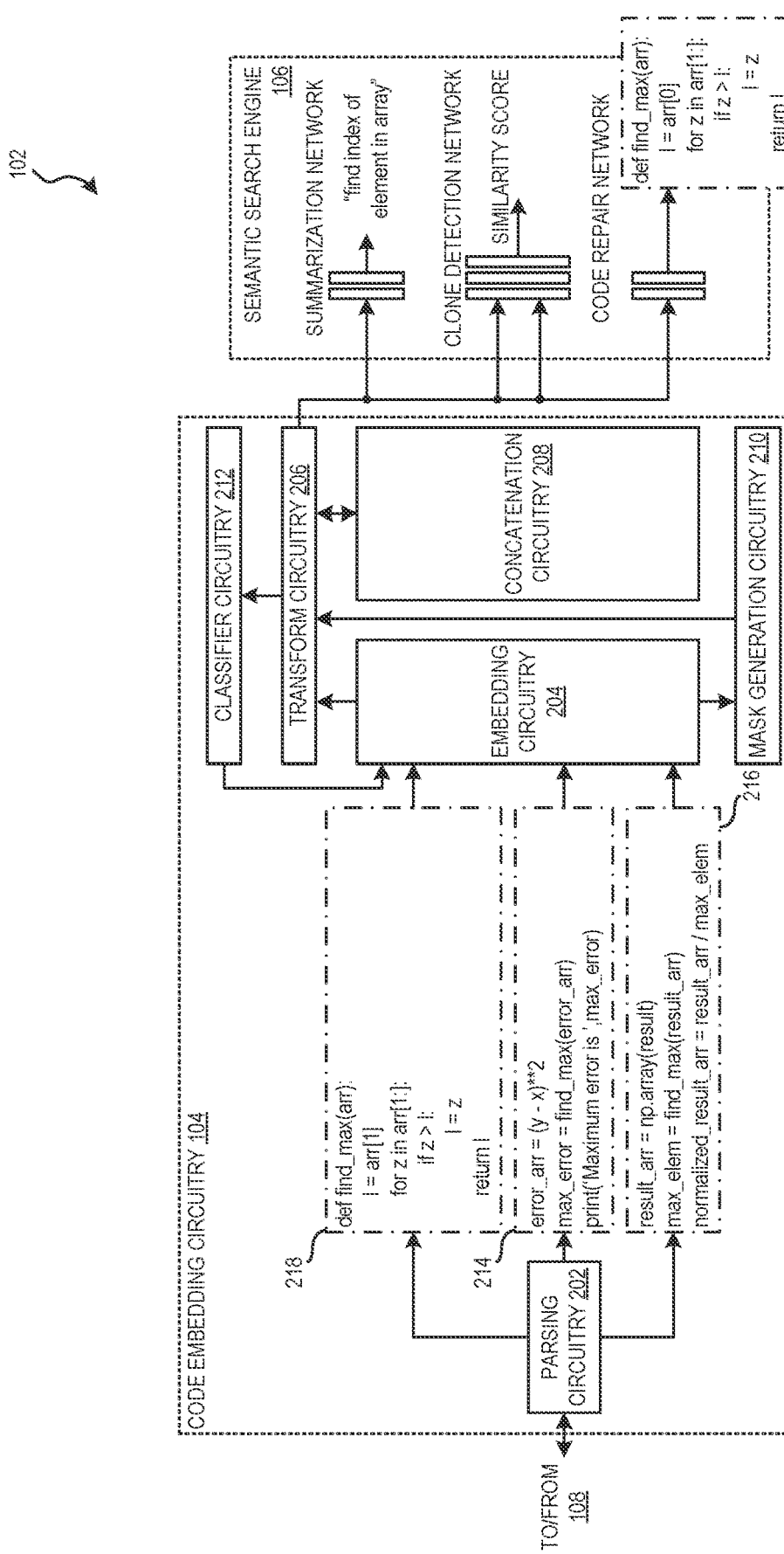
FIG. 2 is a block diagram illustrating an example implementation of the code embedding circuitry of FIG. 1 to generate usage dependent code embeddings.

FIG. 2 is a block diagram illustrating an example implementation of the code embedding circuitry 104 of FIG. 1 to generate usage dependent code embeddings. In the illustrated example of FIG. 2, the code embedding circuitry 104 includes example parsing circuitry 202, example embedding circuitry 204, example transform circuitry 206, example concatenation circuitry 208, example mask generation circuitry 210, and example classifier circuitry 212. The code embedding circuitry 104 of FIG. 2 may be instantiated (e.g., creating an instance of, bring into being for any length of time, materialize, implement, etc.) by processor circuitry such as a central processor unit executing instructions. Additionally or alternatively, the code embedding circuitry 104 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on a microprocessor.

In the illustrated example of FIG. 2, the parsing circuitry 202 is coupled to the network 108 embedding circuitry 204. In the example of FIG. 2, the parsing circuitry 202 obtains training data and/or code including a code snippet to be processed by an AI/ML model (e.g., the semantic search engine 106). In some examples, interface circuitry of the service provider 102 obtains training data and/or code including a code snippet to be processed by an AI/ML model (e.g., the semantic search engine 106).

In the illustrated example of FIG. 2, the parsing circuitry 202 parses the code to select a usage context of the code snippet including a first number of LOCs before the code snippet or LOC at which the code snippet is called, the code snippet, and a second number of LOCs after the code snippet or LOC at which the code snippet is called. The parsing circuitry 202 also determines whether the code includes an additional instance of the code snippet or an additional LOC calling the code snippet (e.g., when the code snippet is a function) to serve as usage contexts. In the example of FIG. 2, in response to determining that the code includes an additional instance of the code snippet or an additional LOC calling the code snippet (e.g., a function), the parsing circuitry 202 selects a usage context of the next instance of the code snippet or the next LOC calling the code snippet (e.g., a function) where the usage context includes a first number of LOCs before the next instance of the code snippet or the next LOC calling the code snippet, the next instance of the code snippet or the next LOC calling the code snippet, and a second number of LOCs after the next instance of the code snippet or the next LOC calling the code snippet. After the code embedding circuitry 104 completes the embedding procedure, the example parsing circuitry 202 determines whether there is additional code to be processed by the AI/ML model (e.g., implemented by the semantic search engine 106).

In the illustrated example of FIG. 2, when processing code is obtained via the network 108, the parsing circuitry 202 identifies an example first usage context 214 of a code snippet to be processed by the semantic search engine 106 and an example second usage context 216 of the code snippet to be processed by the semantic search engine 106. Additionally, in the example of FIG. 2, the code snippet is a function represented by an example body of the function 218. The parsing circuitry 202 selects the first usage context 214, the second usage context 216, and the body of the function 218 and transmits the first usage context 214, the second usage context 216, and the body of the function 218 to the embedding circuitry 204.

In the example of FIG. 2, the first number of LOCs before a code snippet and/or an LOC calling a code snippet that is a function is one (e.g., the first number of LOCs=1). In the example of FIG. 2, the second number of LOCs after a code snippet and/or an LOC calling a code snippet that is a function is one (e.g., the second number of LOCs=1). As such, individual usage contexts include at least three LOCs: the LOC at which the code snippet to be embedded is recited (this may be one or more LOCs), one LOC before the code snippet, and one LOC after the code snippet. However, in alternative examples, the first number of LOCs before a code snippet and/or an LOC calling a code snippet that is a function and/or the second number of LOCs after the code snippet and/or an LOC calling the code snippet that is a function may be different. For example, a usage context includes at least one LOC before the code snippet or LOC at which the code snippet is called, the code snippet, and at least one LOC after the code snippet or LOC at which the code snippet is called.

In some examples, the designer of the code embedding circuitry 104 and/or the semantic search engine 106 can choose the size of usage contexts (e.g., the number of LOCs before a code snippet to be embedded and/or an LOC calling a code snippet that is a function and/or the number of LOCs after the code snippet to be embedded and/or an LOC calling the code snippet is a function). For example, depending on the type of functions and/or code snippets to be processed in downstream operations, the number of LOCs before and/or after a code snippet and/or an LOC calling a code snippet that is a function may change. For functions and/or code snippets that utilize many variables and/or produce results that are utilized in many ways, the number of LOCs before and/or after a code snippet and/or an LOC calling a code snippet that is a function may be greater than that of functions and/or code snippets that utilize few variables and/or produce results that are utilized in few ways. However, the computational burden of increasing the number of LOCs before and/or after a code snippet and/or an LOC calling a code snippet that is a function should be balanced with the impact on performance of downstream tasks. In some examples, the first number of LOCs before a code snippet and/or an LOC calling a code snippet that is a function and/or the second number of LOCs after the code snippet and/or an LOC calling the code snippet that is a function can be any integer based on user and/or manufacturer preferences.

In examples disclosed herein, the first number of LOCs before a code snippet and/or an LOC calling a code snippet that is a function corresponds to a first threshold number of LOCs. Additionally, in examples disclosed herein the second number of LOCs after the code snippet and/or an LOC calling the code snippet that is a function corresponds to a second threshold number of LOCs. In some examples, the second threshold number of LOCs is different from the first threshold number of LOCs.

Example implementations of the first usage context 214, the second usage context 216, and the body of the function 218 are illustrated in pseudocode 1, pseudocode 2, and pseudocode 3, respectively, below.

```
error_arr = (y - x)**2
max_error = find_max(error_arr)
print('Maximum error is ',max_error)
                    Pseudocode 1
result_arr = np.array(result)
max_elem = find_max(result_arr)
normalized_result_arr = result_arr / max_elem
                    Pseudocode 2
def find_max(arr):
    1 = arr[1]
    for z in arr[1:]:
        if z > 1:
            1 = z
    return 1
                    Pseudocode 3
```

In the illustrated example of FIG. 2, the embedding circuitry 204 is coupled to the parsing circuitry 202, the transform circuitry 206, the mask generation circuitry 210, and the classifier circuitry 212. In the example of FIG. 2, the embedding circuitry receives one or more usage contexts and/or a code snippet (e.g., a body of a function) from the parsing circuitry 202. For example, the embedding circuitry 204 receives the first usage context 214, the second usage context 216, and the body of the function 218 from the parsing circuitry 202.

In the illustrated example of FIG. 2, the embedding circuitry 204 generates a list of one or more tokens for selected usage contexts, for the code snippet, and/or for the body of a function (e.g., a function body) when the code snippet is a function. For example, for usage contexts, the embedding circuitry 204 separates the string of text selected by the parsing circuitry 202 into one or more groupings of one or more characters. Example lists of one or more tokens are further described below. For usage contexts, the embedding circuitry 204 also appends a close token (cls) to the list of one or more tokens for that usage context. The close token indicates termination of a usage context.

After generating the lists of one or more tokens for the selected usage contexts, the code snippet, and/or for the body of a function (when the code snippet is a function) and appending a close token (cls) to the list of one or more tokens for the usage contexts, the embedding circuitry 204 generates a list of one or more token embedding vectors for the lists of one or more tokens. The lists of one or more token embedding vectors includes a token embedding vector for the tokens in the list of one or more tokens. For example, the embedding circuitry 204 initialize an embedding matrix and/or a table that maps the possible tokens to a real-valued vector that is referred to as a token embedding vector. The embedding circuitry 204 converts the list of one or more tokens into a list of one or more token embedding vectors by mapping the tokens to corresponding token embedding vectors. The token embedding vectors are learnable.

In the illustrated example of FIG. 2, the transform circuitry 206 is coupled to the embedding circuitry 204, the concatenation circuitry 208, the mask generation circuitry 210, the classifier circuitry 212, and the semantic search engine 106. In the example of FIG. 2, the transform circuitry 206 implements one or more transformer models to transform the token embedding vectors, as further described below. However, in additional or alternative examples, the transform circuitry 206 can implement other AI/ML model(s) such as one or more RNNs, one or more LSTM models, and/or one or more GRU models. In the example of FIG. 2, for the lists of one or more token embedding vectors, the transform circuitry 206 generates a list of one or more transformed token embedding vectors. In the example of FIG. 2, the transformed token embedding vectors are real-valued vectors. The real-valued output vector for the lists of one or more token embedding vectors depends on other token embedding vectors. The transform circuitry 206 forwards the lists of one or more transformed token embedding vectors to the concatenation circuitry 208 after generating a list of one or more transformed token embedding vectors for the lists of one or more token embedding vectors.

In the example of FIG. 2, the concatenation circuitry 208 is coupled to the transform circuitry 206. In the example of FIG. 2, the concatenation circuitry 208 concatenates the transformed token embedding vector of the close token for the usage contexts and the list of one or more transformed token embedding vectors for the code snippet or for the body of the function (when the code snippet is a function). As such, the transformed token embedding vector of the close token represents the fixed-sized embedding for that usage context. The concatenation circuitry 208 additionally appends a close vector ($z_{sp}$) to the concatenated list of one or more transformed token embedding vectors. In examples disclosed herein, the close vector indicates termination of the concatenated list of one or more transformed token embedding vectors. The concatenation circuitry 208 then forwards the concatenated list of one or more transformed token embedding vectors to the transform circuitry 206.

In the example of FIG. 2, the transform circuitry 206 generates a transformed concatenated list of one or more transformed token embedding vectors. The length of the transformed concatenated list depends on the number of tokens in the function body (e.g., the code snippet) as well as the number of usage contexts. Subsequently, the transform circuitry 206 transmits at least one of the transformed concatenated list or the transformed close vector to the semantic search engine 106. For example, some downstream tasks such as code summarization or code repair expect a variable size embedding list. In this manner the semantic search engine 106 can use the transformed concatenated list as the usage dependent embedding. In some examples, processor circuitry performing other tasks, such as clone detection, may expect a fixed-size embedding vector. In such examples, the task can use the transformed close vector (e.g., the last real-valued vector in the transformed concatenated list (e.g., the vector corresponding to $z_{sp}$)) as the fixed size usage dependent embedding.

In the example of FIG. 2, the semantic search engine 106 performs one or more code intelligence tasks based on the usage dependent embedding generated by the code embedding circuitry 104. For example, when executing a code repair task, the semantic search engine 106 determines that the body of the function 218 (e.g., the find_max function) has a functional bug where the first element (e.g., element 0) in the array is not considered. Additionally, as described above, by incorporating usage contexts into the embedding procedure, the code embedding circuitry 104 provides additional information to the semantic search engine 106. For example, the second usage context 216 of the code snippet indicates that the function (e.g., the body of the function 218) accepts as an input a NumPy array (e.g., an array that is compatible with the NumPy library for Python which adds support for large multi-dimensional arrays and matrices as well as for high-level mathematical functions to operate on these arrays and matrices). This is a valuable piece of information that typically is missing from the function body in an untyped language and, as such, would be missed by existing embedding techniques.

The example code embedding circuitry 104 of FIG. 2 also includes the mask generation circuitry 210 and the classifier circuitry 212. In the example of FIG. 2, the mask generation circuitry 210 is coupled to the embedding circuitry 204 and the transform circuitry 206. In the example of FIG. 2, the classifier circuitry 212 is coupled to the embedding circuitry 204 and the transform circuitry 206. The code embedding circuitry 104 utilizes the mask generation circuitry 210 and the classifier circuitry 212 during training.

During training, the mask generation circuitry 210 of FIG. 2 generates a bitmask (e.g., a vector of some combination of zeros and ones, including at least one zero) for a code snippet (e.g., a function body) and multiplies the list of one or more token embedding vectors for the code snippet (e.g., the body of the function) by the bitmask. As such, at least one of the values of the list one or more token embedding vectors for the code snippet (e.g., the body of the function) is masked (e.g., set to zero). Additionally, during training, the classifier circuitry 212 classifies the masked token after the code embedding procedure is complete. The embedding circuitry 204 compares the classified value(s) of the masked token(s) to the actual value of the masked token(s). For each masked token, the classifier circuitry 212 produces a probability distribution over all possible tokens (e.g., a vector with positive entries with a sum that is equal to one and a size that is the number of possible tokens). The loss function for each masked token is the distance between the predicted probability vector for that masked token and the ideal probability vector that assigns a probability of one (1) to the correct token and zero (0) to all other tokens. The total loss function is the sum of the loss functions of all masked tokens. The goal of training is to minimize the total loss in order to encourage the model to assign the highest probability (e.g., a probability of one (1)) to the correct tokens and the lowest probability (e.g., a probability of zero (0)) to the incorrect tokens. This goal can be achieved by using backpropagation techniques to adjust the parameters of the embedding circuitry 204 and/or the transform circuitry 206 to minimize total loss. Training proceeds until the total loss becomes lower than a threshold and/or until the total loss stops decreasing. After training completes, the AI/ML model implementing the code embedding circuitry 104 is deployed.

While an example embedding procedure has been discussed with respect to FIG. 2, in additional or alternative examples, other embedding procedures may be implemented to embed a function body, code snippet, and/or one or more usage contexts.

In some examples, the code embedding circuitry 104 includes means for parsing code. For example, the means for parsing code may be implemented by the parsing circuitry 202. In some examples, the parsing circuitry 202 may be instantiated by processor circuitry such as the example processor circuitry 812 of FIG. 8. For instance, the parsing circuitry 202 may be instantiated by the example general purpose microprocessor circuitry 900 of FIG. 9 executing machine executable instructions such as that implemented by at least blocks 602, 604, 606, and 608 of FIG. 6 and/or at least blocks 702, 704, 706, 708, and 726 of FIG. 7. In some examples, the parsing circuitry 202 may be instantiated by hardware logic circuitry, which may be implemented by an ASIC or the FPGA circuitry 1000 of FIG. 10 structured to perform operations corresponding to the machine-readable instructions. Additionally or alternatively, the parsing circuitry 202 may be instantiated by any other combination of hardware, software, and/or firmware. For example, the parsing circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate. In some examples, an ASIC refers to application specific integrated circuitry.

In some examples, the code embedding circuitry 104 includes means for embedding code. For example, the means for embedding code may be implemented by the embedding circuitry 204. In some examples, the embedding circuitry 204 may be instantiated by processor circuitry such as the example processor circuitry 812 of FIG. 8. For instance, the embedding circuitry 204 may be instantiated by the example general purpose microprocessor circuitry 900 of FIG. 9 executing machine executable instructions such as that implemented by at least blocks 610, 612, 614, 630, and 632 of FIG. 6 and/or at least blocks 710, 712, and 714 of FIG. 7. In some examples, the embedding circuitry 204 may be instantiated by hardware logic circuitry, which may be implemented by an ASIC or the FPGA circuitry 1000 of FIG. 10 structured to perform operations corresponding to the machine-readable instructions. Additionally or alternatively, the embedding circuitry 204 may be instantiated by any other combination of hardware, software, and/or firmware. For example, the embedding circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the code embedding circuitry 104 includes means for transforming vectors. For example, the means for transforming vectors may be implemented by the transform circuitry 206. In some examples, the transform circuitry 206 may be instantiated by processor circuitry such as the example processor circuitry 812 of FIG. 8. For instance, the transform circuitry 206 may be instantiated by the example general purpose microprocessor circuitry 900 of FIG. 9 executing machine executable instructions such as that implemented by at least blocks 620, 626, and 634 of FIG. 6 and/or at least blocks 716, 722, and 724 of FIG. 7. In some examples, the transform circuitry 206 may be instantiated by hardware logic circuitry, which may be implemented by an ASIC or the FPGA circuitry 1000 of FIG. 10 structured to perform operations corresponding to the machine-readable instructions. Additionally or alternatively, the transform circuitry 206 may be instantiated by any other combination of hardware, software, and/or firmware. For example, the transform circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the code embedding circuitry 104 includes means for concatenating vectors. For example, the means for concatenating vectors may be implemented by the concatenation circuitry 208. In some examples, the concatenation circuitry 208 may be instantiated by processor circuitry such as the example processor circuitry 812 of FIG. 8. For instance, the concatenation circuitry 208 may be instantiated by the example general purpose microprocessor circuitry 900 of FIG. 9 executing machine executable instructions such as that implemented by at least blocks 622 and 624 of FIG. 6 and/or at least blocks 718 and 720 of FIG. 7. In some examples, the concatenation circuitry 208 may be instantiated by hardware logic circuitry, which may be implemented by an ASIC or the FPGA circuitry 1000 of FIG. 10 structured to perform operations corresponding to the machine-readable instructions. Additionally or alternatively, the concatenation circuitry 208 may be instantiated by any other combination of hardware, software, and/or firmware. For example, the concatenation circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the code embedding circuitry 104 includes means for generating a mask. For example, the means for generating a mask may be implemented by the mask generation circuitry 210. In some examples, the mask generation circuitry 210 may be instantiated by processor circuitry such as the example processor circuitry 812 of FIG. 8. For instance, the mask generation circuitry 210 may be instantiated by the example general purpose microprocessor circuitry 900 of FIG. 9 executing machine executable instructions such as that implemented by at least blocks 616 and 618 of FIG. 6. In some examples, the mask generation circuitry 210 may be instantiated by hardware logic circuitry, which may be implemented by an ASIC or the FPGA circuitry 1000 of FIG. 10 structured to perform operations corresponding to the machine-readable instructions. Additionally or alternatively, the mask generation circuitry 210 may be instantiated by any other combination of hardware, software, and/or firmware. For example, the mask generation circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the code embedding circuitry 104 includes means for classifying. For example, the means for classifying may be implemented by the classifier circuitry 212. In some examples, the classifier circuitry 212 may be instantiated by processor circuitry such as the example processor circuitry 812 of FIG. 8. For instance, the classifier circuitry 212 may be instantiated by the example general purpose microprocessor circuitry 900 of FIG. 9 executing machine executable instructions such as that implemented by at least block 628 of FIG. 6. In some examples, the classifier circuitry 212 may be instantiated by hardware logic circuitry, which may be implemented by an ASIC or the FPGA circuitry 1000 of FIG. 10 structured to perform operations corresponding to the machine-readable instructions. Additionally or alternatively, the classifier circuitry 212 may be instantiated by any other combination of hardware, software, and/or firmware. For example, the classifier circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the service provider 102 includes means for processing searches. For example, the means for processing searches may be implemented by the semantic search engine 106. In some examples, the semantic search engine 106 may be instantiated by processor circuitry such as the example processor circuitry 812 of FIG. 8 and/or other processor circuitry. For instance, the semantic search engine 106 may be instantiated by general purpose microprocessor circuitry such as the example general purpose microprocessor circuitry 900 of FIG. 9 executing machine executable instructions. In some examples, the semantic search engine 106 may be instantiated by hardware logic circuitry, which may be implemented by an ASIC or FPGA circuitry such as the FPGA circuitry 1000 of FIG. 10 structured to perform operations corresponding to the machine-readable instructions. Additionally or alternatively, the semantic search engine 106 may be instantiated by any other combination of hardware, software, and/or firmware. For example, the semantic search engine 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

Figure 3:
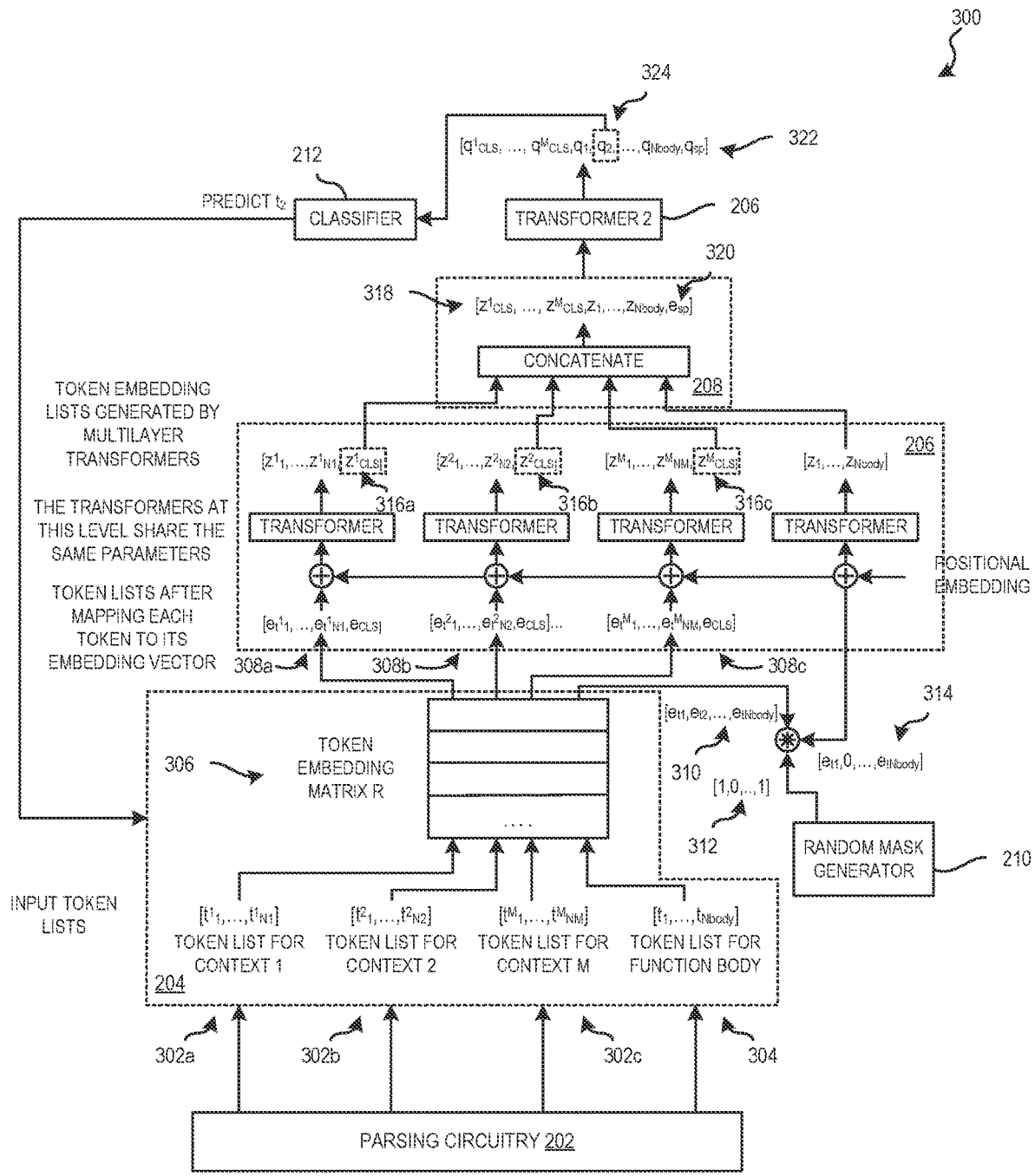
FIG. 3 is a flow diagram illustrating example processes to train the code embedding circuitry of FIGS. 1 and/or 2.

FIG. 3 is a flow diagram illustrating example processes 300 to train the code embedding circuitry 104 of FIGS. 1 and/or 2. In the illustrated example of FIG. 3, the code embedding circuitry 104 implements a K-layer transformer model to generate top level embeddings for a code snippet. In the example of FIG. 3, the code snippet is a function body. However, the code snippet may be LOCs in the body of a program that do define a function body. The example code embedding circuitry 104 implements self-supervised training. The code embedding circuitry 104 of FIG. 3 executes and/or instantiates a masked token prediction task where some (e.g., at least one) of the tokens in the function body is masked (e.g., set to zero) and trains the code embedding circuitry 104 to predict the masked (e.g., hidden) token(s). In the example of FIG. 3, the second token in the function body is masked (e.g., the embedding vector of the second token of the function body is set to zero (0)), and the code embedding circuitry 104 is tasked with using the top level embedding to predict the masked token.

In the illustrated example of FIG. 3, the parsing circuitry 202 obtains code including a code snippet to be processed by the semantic search engine 106. As such, the parsing circuitry 202 selects usage contexts for the code snippet as well as the body of the function representing the code snippet. For usage contexts, the parsing circuitry 202 selects the one or more LOCs before the LOC calling the function, the LOC calling the function, and one or more LOCs after the LOC calling the function. The parsing circuitry 202 forwards the selected code to the embedding circuitry 204.

In the illustrated example of FIG. 3, the parsing circuitry 202 selects M usage contexts where the function is used and/or called. The usage contexts can have a variable size but in examples disclosed herein, all usage contexts include 2L LOCs and the LOC in which the function is used and/or called. For example, a usage context includes L LOCs before the LOC in which the function body is used and/or called, L LOCs after the line in which the function body is used and/or called, and the LOC in which the function body is used and/or called.

In the illustrated example of FIG. 3, the embedding circuitry 204 generates a first list of one or more tokens 302*a* for a first usage context, a second list of one or more tokens 302*b* for a second usage context, a third list of one or more tokens 302*c* for an Mth usage context, and a list of one or more tokens 304 for the body of the function. In examples disclosed herein, the lists of one or more tokens for usage contexts are denoted $[t_1^i, \ldots, t_{N_i}^i]$ where $N_i$ is the number of tokens in the ith usage context and i ranges from 1 to M. In examples disclosed herein, the list of one or more token for the body of the function is denoted $[t_1, \ldots, t_{N_{body}}]$ where $N_{body}$ is the number of tokens in the body of the function. Examples of the first list of one or more tokens 302*a* for the first usage context, the second list of one or more tokens 302*b* for the second usage context, the third list of one or more tokens 302*c* for the Mth usage context, and the list of one or more tokens 304 for the body of the function are illustrated in list 1, list 2, list 3, and list 4 respectively, below.

$$t_1^1, \ldots, t_{N_1}^1 \qquad \text{List 1}$$

$$t_1^2, \ldots, t_{N_2}^2 \qquad \text{List 2}$$

$$t_1^M, \ldots, t_{N_M}^M \qquad \text{List 3}$$

$$t_1, \ldots, t_{N_{body}} \qquad \text{List 4}$$

In the illustrated example of FIG. 3, for selected usage contexts, the embedding circuitry 204 appends a close token to the list of one or more tokens for that usage context. In the example of FIG. 3, the embedding circuitry 204 initializes a token embedding matrix 306 (R) of fixed-size, learnable, embedding vectors of dimension E for possible tokens in the source code, where $e_t$ is the embedding vector for token t. The embedding circuitry 204 arranges these embedding vectors as the rows of the token embedding matrix 306 (R) which has dimension V×E, where V is the size of the source code token vocabulary.

In the illustrated example of FIG. 3, the example embedding circuitry 204 generates a list of one or more token embedding vectors for lists of one or more tokens. In the example of FIG. 3, a list of one or more token embedding vectors may include a token embedding vector for tokens of that list. In the example of FIG. 3, the embedding circuitry 204 converts input tokens to the corresponding token embedding vectors by looking up the token embedding vector of a token in the token embedding matrix 306 (R). Lists of one or more token embedding vector is represented as $$[e_{t_1^i}, \ldots, e_{t_{N_i}^i}].$$

In the illustrated example of FIG. 3, the embedding circuitry 204 generates a first list of one or more token embedding vectors 308*a* for the first list of one or more tokens 302*a*, a second list of one or more token embedding vectors 308*b* for the second list of one or more tokens 302*b*, a third list of one or more token embedding vectors 308*c* for the third list of one or more tokens 302*c*, and a list of one or more token embedding vectors 310 for the list of one or more tokens 304 for the body of the function. The embedding circuitry 204 constructs the token embedding vectors from the code text (e.g., from the sequence of tokens in the function body and the usage contexts), without using any intermediate structural representation. Examples of the first list of one or more token embedding vectors 308*a* for the first list of one or more tokens 302*a*, the second list of one or more token embedding vectors 308*b* for the second list of one or more tokens 302*b*, the third list of one or more token embedding vectors 308*c* for the third list of one or more tokens 302*c*, and the list of one or more token embedding vectors 310 for the list of one or more tokens 304 for the body of the function are illustrated in list 5, list 6, list 7, and list 8 respectively, below.

$$e_{t_1^1}, \ldots, e_{t_{N_1}^1}, e_{cls}^1 \qquad \text{List 5}$$

$$e_{t_1^2}, \ldots, e_{t_{N_2}^2}, e_{cls}^2 \qquad \text{List 6}$$

$$e_{t_1^M}, \ldots, e_{t_{N_M}^M}, e_{cls}^M \qquad \text{List 7}$$

$$e_{t_1}, \ldots, e_{t_{N_{body}}} \qquad \text{List 8}$$

In the illustrated example of FIG. 3, the embedding circuitry 204 initializes $N_{max}$ positional embedding vectors of dimension E, where $N_{max}$ is the maximum length of token sequences that are fed to the code embedding circuitry 104. The positional embedding vectors are denoted as $p_1, \ldots, p_{N_{max}}$. The embedding circuitry 204 then adds the positional embedding vectors to the token embedding vectors of the usage contexts to obtain the sequences $$[e_{t_1^i} + p_1, \ldots, e_{t_{N_i}^i} + p_{N_i}, e_{cls}^i + p_{N_i+1}].$$

The embedding circuitry 204 also adds the positional embedding vectors to the list of one or more token embedding vectors 310 for the list of one or more tokens 304 for the body of the function to obtain the sequence $$[e_{t_1} + p_1, \ldots, e_{t_{N_{body}}} + p_{N_{body}}].$$

In the illustrated example of FIG. 3, to train the transform circuitry 206, the code embedding circuitry 104 utilizes masked token prediction training in a plurality of training iterations. In a training iteration, the mask generation circuitry 210 generates a bitmask 312 (e.g., a random bitmask) of zeros and ones of size $N_{body}$. The bitmask 312 is multiplied by the positional adjusted list of one or more token embedding vectors 310 for the list of one or more tokens 304 for the body of the function $$\left(\text{e.g., } e_{t_1} + p_1, \ldots, e_{t_{N_{body}}} + p_{N_{body}}\right)$$

and sets token embeddings corresponding to zero positions in the bitmask 312 to a zero vector as illustrated in a masked list of one or more token embedding vectors 314 for the list of one or more tokens 304 for the body of the function.

In the illustrated example of FIG. 3, the transform circuitry 206 implements one or more transformer layers of the K-layer transformer model. For i in 1 to K, the transform circuitry 206 executes and/or instantiates equation 1 below.

$$q^{i,h} = W_q^{i,h} z^{i-1}, \quad k^{i,h} = W_k^{i,h} z^{i-1}, \quad v^{i,h} = W_v^{i,h} z^{i-1} \qquad \text{Equation 1}$$

In equation 1, $W_q^{i,h}$, $W_k^{i,h}$, and $W_v^{i,h}$ are a learnable query matrix, a learnable key matrix, and a learnable value projection matrix for attention head h in a transformer layer i, respectively. In the example of FIG. 3, h ranges from 1 to H, where H is the number of attention heads. In equation 1, $q^{i,h}$, $k^{i,h}$, and $v^{i,h}$ have dimensions $N \times d_{model}$, where $d_{model}$ is the width of the K-layer transformer model executed and/or instantiated by the code embedding circuitry 104. In equation 1, $z^{i-1}$ is the output of the previous transformer layer (e.g., layer i–1). The transform circuitry 206 then executes and/or instantiates a softmax function row-wise as illustrated in equation 2 and equation 3 below.

$$u^{i,h} = \text{softmax}\left(\frac{((q^{i,h})^T k^{i,h})}{\sqrt{d_{model}}}\right) v^{i,h} \qquad \text{Equation 2}$$

$$u^i = \text{concat}(u^{i,0}, \ldots, u^{i,H}) \qquad \text{Equation 3}$$

In the example of FIG. 3, a softmax function refers to a function that normalizes input values to a probability distribution. A concat function refers to a function that concatenates input values. In the example of FIG. 3, the output of equation 3 has dimension $NH \times d_{model}$. The transform circuitry 206 then generates a list of one or more transformed token embedding vectors $z^i$ for lists of one or more token embedding vectors according to equation 4 below.

$$z^i = W_p^i u^i \qquad \text{Equation 4}$$

In equation 4, the list of one or more transformed token embedding vectors has dimensions $N \times d_{model}$. In the example of FIG. 3, for usage contexts, the list of one or more transformed token embedding vectors is represented by the sequence $z^K = [z_1^i, \ldots, z_{N_i}^i, z_{cls}^i]$. In the example of FIG. 3, the list of one or more transformed token embedding vectors for the function body is represented by the sequence $z = [z_1, \ldots, z_{N_{body}}]$.

In the illustrated example of FIG. 3, the concatenation circuitry 208 concatenates the transformed token embedding vector of the close token (e.g., $z_{cls}^i$) for usage contexts and the list of one or more transformed token embedding vectors for the function body (e.g., $z_1, \ldots, z_{N_{body}}$). For example, the concatenation circuitry 208 prepends a first transformed token embedding vector of the close token 316a ($z_{cls}^1$) for the first usage context, a second transformed token embedding vector of the close token 316b ($z_{cls}^2$) for the second usage context, and a third transformed token embedding vector of the close token 316c ($z_{cls}^M$) for the Mth usage context to the list of one or more transformed token embedding vectors for the function body (e.g., $z_1, \ldots, z_{N_{body}}$) to yield a concatenated list of one or more transformed token embedding vectors 318 ($z_{cls}^1, \ldots, z_{cls}^M, z_1, \ldots, z_{N_{body}}$). In this manner, the transformed token embedding vector of the close token (e.g., $z_{cls}^i$) for the usage contexts represent that usage context. In some examples, the concatenation circuitry 208 prepends the transformed token embedding vector of the close token (e.g., $z_{cls}^i$) to the list of one or more transformed token embedding vectors for the function body in any order.

In the illustrated example of FIG. 3, the concatenation circuitry 208 also appends a close vector ($e_{sp}$) to the concatenated list of one or more transformed token embedding vectors 318 (e.g., $z_{cls}^1, \ldots, z_{cls}^M, z_1, \ldots, z_{N_{body}}$). The transform circuitry 206 subsequently processes the concatenated list of one or more transformed token embedding vectors 318 to generate a transformed concatenated list of one or more transformed token embedding vectors 322 (e.g., $q_{cls}^1, \ldots, q_{cls}^M, q_1, q_2, \ldots, q_{N_{body}}, q_{sp}$). For example, the transform circuitry 206 implements a second transformer layer of the K-layer transformer model. In examples disclosed herein, the first transformer layer and the second transformer layer may include the same parameters or different parameters. In the example of FIG. 3, the classifier circuitry 212 (e.g., executing and/or instantiating a multi-layer perceptron) processes the top-level embeddings of the masked tokens (for example $q_2$ 324) and predicts the identity of the masked token.

In the illustrated example of FIG. 3, the code embedding circuitry 104 implements classification loss (e.g., cross-entropy loss) to train the classifier circuitry 212 and more generally, the code embedding circuitry 104. In response to the classification loss being greater than a threshold, the code embedding circuitry 104 backpropagates the error through the K-layer transformer model to update one or more weights of the model. In response to the classification loss being less than or equal to a threshold at the end of training, the K-layer transformer model is deployed to the be executed and/or instantiated by the code embedding circuitry 104. After training, the code embedding circuitry 104 may not utilize the mask generating circuitry 210 or the classifier circuitry 212. However, in additional or alternative examples, the code embedding circuitry 104 may utilize the mask generating circuitry 210 and/or the classifier circuitry 212 after training.

Figure 4:
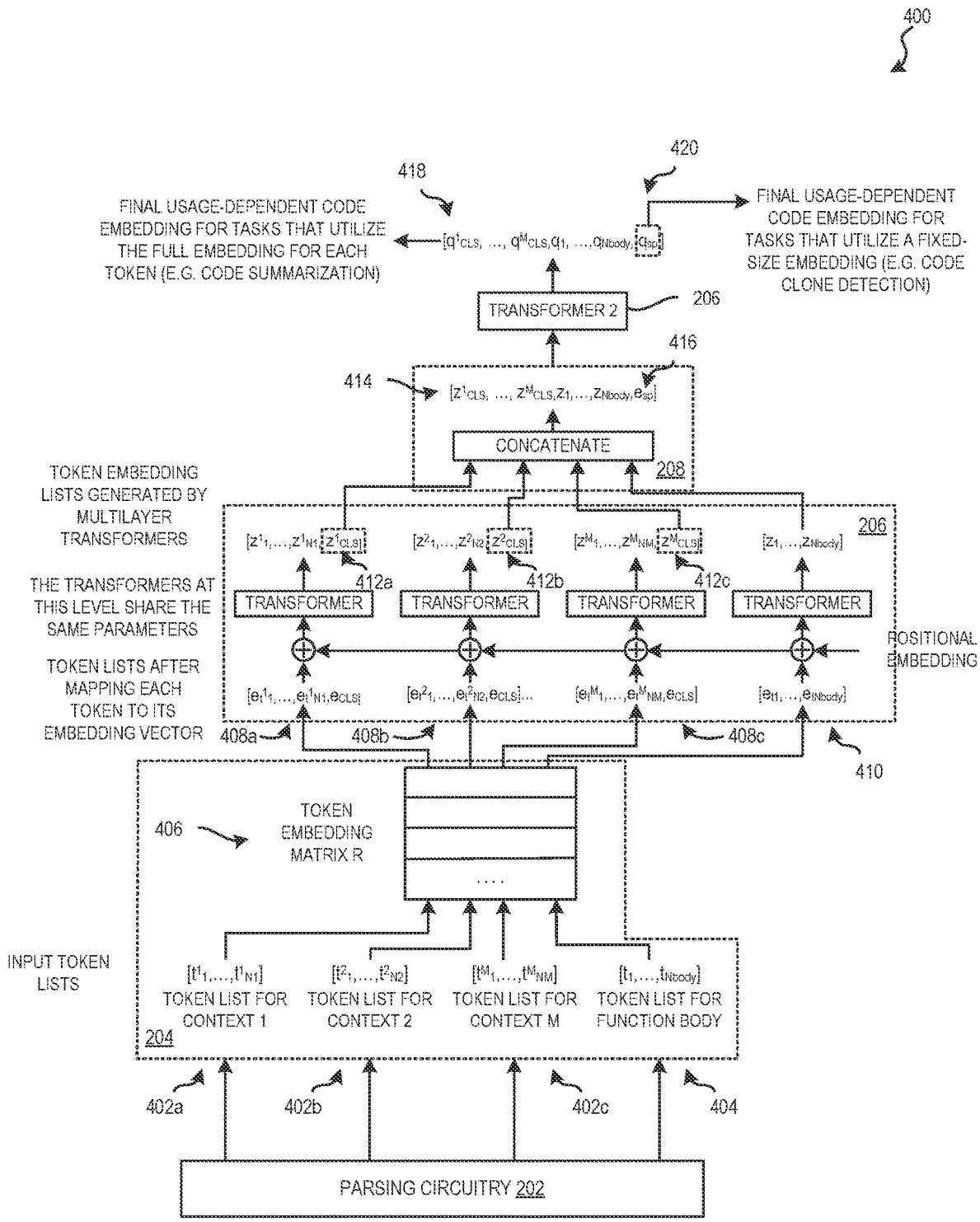
FIG. 4 is a flow diagram illustrating example processes to generate usage dependent code embeddings.

FIG. 4 is a flow diagram illustrating example processes 400 to generate usage dependent code embeddings. In the illustrated example of FIG. 4, the code embedding circuitry 104 implements a K-layer transformer model to generate top level embeddings for a code snippet. In the example of FIG. 4, the parsing circuitry 202 obtains code including a code snippet to be processed by the semantic search engine 106. In the example of FIG. 4, the code snippet is a function body. As such, the parsing circuitry 202 selects usage contexts for the code snippet including the LOCs around the LOC calling the function, the LOC calling the function, and the body of the function. The parsing circuitry 202 forwards the selected code to the embedding circuitry 204.

In the illustrated example of FIG. 4, the parsing circuitry 202 selects M usage contexts where the function is used and/or called. In the example of FIG. 4, the embedding circuitry 204 generates a first list of one or more tokens 402a for a first usage context, a second list of one or more tokens 402b for a second usage context, a third list of one or more tokens 402c for an Mth usage context, and a list of one or more tokens 404 for the body of the function.

In the illustrated example of FIG. 4, for the selected usage contexts, the embedding circuitry 204 appends a close token to the list of one or more tokens for that usage context. In the example of FIG. 4, the embedding circuitry 204 initializes a token embedding matrix 406 (R) of fixed-size, learnable, embedding vectors of dimension E for possible tokens in the source code, where $e_t$ is the embedding vector for token t. The embedding circuitry 204 arranges these embedding vectors as the rows of the token embedding matrix 406 (R) which has dimension V×E, where V is the size of the source code token vocabulary.

In the illustrated example of FIG. 4, the example embedding circuitry 204 generates a list of one or more token embedding vectors for the lists of one or more tokens. In the example of FIG. 4, a list of one or more token embedding vectors includes a token embedding vector for the tokens of that list. In the example of FIG. 4, the embedding circuitry 204 converts input tokens to the corresponding token embedding vectors by looking up the token embedding vector of a token in the token embedding matrix 406 (R).

In the illustrated example of FIG. 4, the embedding circuitry 204 generates a first list of one or more token embedding vectors 408a for the first list of one or more tokens 402a, a second list of one or more token embedding vectors 408b for the second list of one or more tokens 402b, a third list of one or more token embedding vectors 408c for the third list of one or more tokens 402c, and a list of one or more token embedding vectors 410 for the list of one or more tokens 404 for the body of the function. In the example of FIG. 4, the embedding circuitry 204 constructs the token embedding vectors from the code text, (e.g., from the sequence of tokens in the function body and the usage contexts), without using any intermediate structural representation.

In the illustrated example of FIG. 4, the embedding circuitry 204 initializes $N_{max}$ positional embedding vectors for the dimension E, where $N_{max}$ is the maximum length of token sequences that are fed to the code embedding circuitry 104. The positional embedding vectors are denoted as $p_1, \ldots, p_{N_{max}}$. The embedding circuitry 204 then adds the positional embedding vectors to the token embedding vectors of the usage contexts to obtain the sequences $$[e_{t_1^i} + p_1, \ldots, e_{t_{N_i}^i} + p_{N_i}, e_{cls}^i + p_{N_i+1}].$$

The embedding circuitry 204 also adds the positional embedding vectors to the list of one or more token embedding vectors 410 for the list of one or more tokens 404 for the body of the function to obtain the sequence $$[e_{t_1} + p_1, \ldots, e_{t_{N_{body}}} + p_{N_{body}}].$$

In the illustrated example of FIG. 4, the transform circuitry 206 implements one or more transformer layers of the K-layer transformer model. In the example of FIG. 4, the transform circuitry 206 executes and/or instantiates equation 1, equation 2, equation 3, and equation 4 as described above. below. In the example of FIG. 4, for usage contexts, the list of one or more transformed token embedding vectors is represented by the sequence $z^K = [z_1^i, \ldots, z_{N_i}^i, z_{cls}^i]$. In the example of FIG. 4, the list of one or more transformed token embedding vectors for the function body is represented by the sequence $z = [z_1, \ldots, z_{N_{body}}]$. Accordingly, the transform circuitry 206 processes a sequence of N token embedding vectors and produces a sequence of N transformed token embedding vectors where the dimension of a transformed token embedding vector is $d_{model}$, $$(e.g., [z_1^i, \ldots, z_{N_i}^i, z_{cls}^i] = \text{transformer}([e_{t_1^i} + p_1, \ldots, e_{t_{N_i}^i} + p_{N_i}, e_{cls}^i + p_{N_i+1}]).$$

In the illustrated example of FIG. 4, a transformer function refers to the one or more transformer layers executed by the transform circuitry 206. In the example of FIG. 4, the concatenation circuitry 208 concatenates the transformed token embedding vector of the close token (e.g., $z_{cls}^i$) for individual usage contexts and the list of one or more transformed token embedding vectors for the function body (e.g., $z_1, \ldots, z_{N_{body}}$). For example, the concatenation circuitry 208 prepends a first transformed token embedding vector of the close token 412a ($z_{cls}^1$) for the first usage context, a second transformed token embedding vector of the close token 412b ($z_{cls}^2$) for the second usage context, and a third transformed token embedding vector of the close token 412c ($z_{cls}^M$) for the Mth usage context to the list of one or more transformed token embedding vectors for the function body (e.g., $z_1, \ldots, z_{N_{body}}$) to yield a concatenated list of one or more transformed token embedding vectors 414 ($z_{cls}^1, \ldots, z_{cls}^M, z_1, \ldots, z_{N_{body}}$). In this manner, the transformed token embedding vector of the close token (e.g., $z_{cls}^i$) for individual usage contexts represents that usage context. In some examples, the concatenation circuitry 208 prepends the transformed token embedding vector of the close token (e.g., $z_{cls}^i$) to the list of one or more transformed token embedding vectors for the function body in any order.

In the illustrated example of FIG. 4, the concatenation circuitry 208 also appends to the concatenated list of one or more transformed token embedding vectors 414 (e.g., $z_{cls}^1, \ldots, z_{cls}^M, z_1, \ldots, z_{N_{body}}$) a close vector 416 ($e_{sp}$). The transform circuitry 206 subsequently processes the concatenated list of one or more transformed token embedding vectors 414 to generate a transformed concatenated list of one or more transformed token embedding vectors 418 (e.g., $q_{cls}^1, \ldots, q_{cls}^M, q_1, q_2, \ldots, q_{N_{body}}, q_{sp}$). For example, the transform circuitry 206 implements a second transformer layer of the K-layer transformer model.

In the illustrated example of FIG. 4, the transformed concatenated list of one or more transformed token embedding vectors 418 (e.g., $q_{cls}^1, \ldots, q_{cls}^M, q_1, q_2, \ldots, q_{N_{body}}, q_{sp}$) includes a transformed close vector 420 ($q_{sp}$). In examples disclosed herein, the transformed close vector 420 ($q_{sp}$) represents the final usage dependent embedding of the function body and/or the code snippet in code intelligence tasks that utilize a fixed-size embedding vector (e.g., clone detection). In additional or alternative examples, for code intelligence tasks that utilize a top-level embedding that includes information about the tokens in the code snippet or function body (e.g., code summarization and/or code repair), the transformed concatenated list of one or more transformed token embedding vectors 418 represents the final usage dependent embedding of the function body and/or the code snippet.

Figure 5:
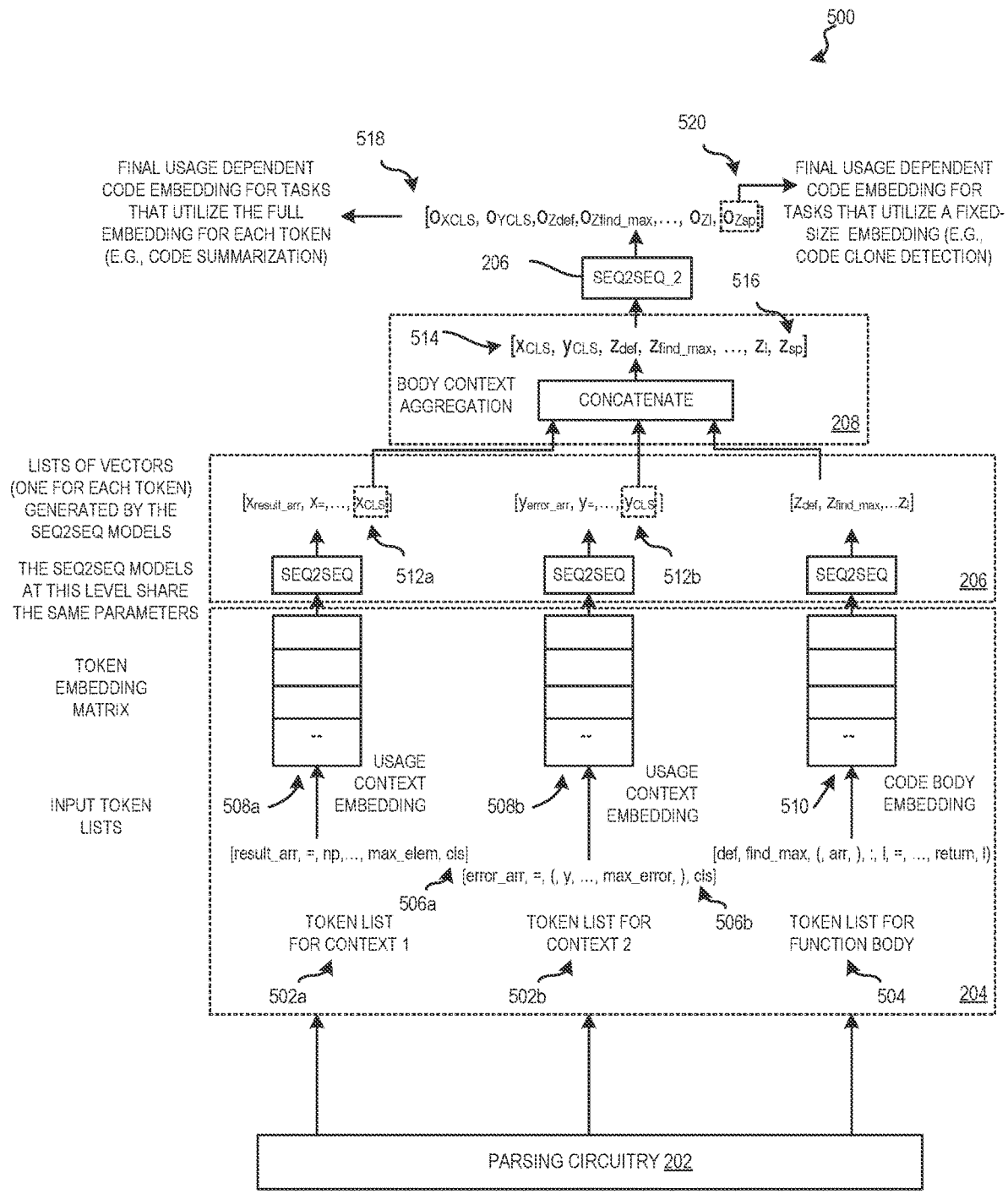
FIG. 5 is a flow diagram illustrating example processes to generate usage dependent code embeddings for an example function that is utilized twice in example code.

FIG. 5 is a flow diagram illustrating example processes 500 to generate usage dependent code embeddings for an example function that is utilized twice in example code. The example code embedding circuitry 104 of FIG. 5 implements a K-layer transformer model to generate top level embeddings for a code snippet. In the example of FIG. 5, the parsing circuitry 202 obtains code including a code snippet to be processed by the semantic search engine 106. The example parsing circuitry 202 of FIG. 5 selects usage contexts for the code snippet, and the body of the function representing the code snippet. The parsing circuitry 202 forwards the selected code to the embedding circuitry 204.

In the illustrated example of FIG. 5, the parsing circuitry 202 selects two (2) usage contexts where the function is used and/or called. In the example of FIG. 5, the embedding circuitry 204 generates a first list of one or more tokens 502a for a first usage context and a second list of one or more tokens 502b for a second usage context and a list of one or more tokens 504 for the body of the function. In the example of FIG. 5, for the first usage context, the embedding circuitry 204 appends a first close token 506a (cls) to the first list of one or more tokens 502a. For the second usage context, the example embedding circuitry 204 of FIG. 5 appends a second close token 506b (cls) to the second list of one or more tokens 502b.

For example, for the first usage context, the second usage context, and the body of the function, the embedding circuitry 204 generates list 9, list 10, and list 11, respectively, below.

[error_arr, =, (, y, . . . , max_error,), cls]   List 9

[result_arr, =, np, . . . , max_elem, cls]   List 10

[def, find_max, (, arr,), :, 1, =, . . . return, 1]   List 11

In examples disclosed herein, there are different ways to tokenize the same text. For example, in the example of FIG. 5, the embedding circuitry 204 treats result_arr as a single token. In an alternative example, a different tokenization technique might cause the embedding circuitry 204 to produce three tokens: "result," "_," and "arr." The designer of the code embedding circuitry 104 can specify a suitable tokenization technique.

In the illustrated example of FIG. 5, the embedding circuitry 204 generates a first list of one or more token embedding vectors 508a for the first list of one or more tokens 502a. Additionally, the example embedding circuitry 204 of FIG. 5 generates a second list of one or more token embedding vectors 508b for the second list of one or more tokens 502b. The example embedding circuitry 204 also generates a list of one or more token embedding vectors 510 for the list of one or more tokens 504 for the body of the function.

In the illustrated example of FIG. 5, the transform circuitry 206 implements one or more transformer layers of the K-layer transformer model. In the example of FIG. 5, the transform circuitry 206 executes and/or instantiates equation 1, equation 2, equation 3, and equation 4 as described above. below. In the example of FIG. 5, the concatenation circuitry 208 concatenates the transformed token embedding vector of the close token for the usage contexts and the list of one or more transformed token embedding vectors for the function body. For example, the concatenation circuitry 208 prepends a first transformed token embedding vector of the close token 512a ($x_{cls}$) for the first usage context and a second transformed token embedding vector of the close token 512b ($y_{cls}$) for the second usage context to the list of one or more token embedding vectors 510 for the list of one or more tokens 504 for the body of the function to yield a concatenated list of one or more transformed token embedding vectors 514. In this manner, the transformed token embedding vector of the close token for a usage context represents that usage context. In some examples, the concatenation circuitry 208 prepends the transformed token embedding vector of the close token to the list of one or more transformed token embedding vectors for the function body in any order.

In the illustrated example of FIG. 5, the concatenation circuitry 208 also appends to the concatenated list of one or more transformed token embedding vectors 514 a close vector 516 ($z_{sp}$). The transform circuitry 206 subsequently processes the concatenated list of one or more transformed token embedding vectors 514 to generate a transformed concatenated list of one or more transformed token embedding vectors 518. For example, the transform circuitry 206 implements a second transformer layer of the K-layer transformer model.

In the illustrated example of FIG. 5, the transformed concatenated list of one or more transformed token embedding vectors 518 includes a transformed close vector 520 ($o_{z_{sp}}$). In examples disclosed herein, the transformed close vector 520 ($o_{z_{sp}}$) represents the final usage dependent embedding of the function body and/or the code snippet in code intelligence tasks that utilize a fixed-size embedding vector (e.g., clone detection). In additional or alternative examples, for code intelligence tasks that utilize a top-level embedding that includes information about tokens in the code snippet or function body (e.g., code summarization and/or code repair), the transformed concatenated list of one or more transformed token embedding vectors 518 represents the final usage dependent embedding of the function body and/or the code snippet.

While an example manner of implementing the code embedding circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example parsing circuitry 202, the example embedding circuitry 204, the example transform circuitry 206, the example concatenation circuitry 208, the example mask generation circuitry 210, the example classifier circuitry 212, and/or, more generally, the example code embedding circuitry 104 of FIGS. 1 and/or 2 and/or the semantic search engine 106, may be implemented by hardware alone or by hardware in combination with software and/or firmware. Thus, for example, any of the example parsing circuitry 202, the example embedding circuitry 204, the example transform circuitry 206, the example concatenation circuitry 208, the example mask generation circuitry 210, the example classifier circuitry 212, and/or, more generally, the example code embedding circuitry 104 of FIGS. 1 and/or 2 and/or the semantic search engine 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example code embedding circuitry 104 of FIG. 1 may include one or more elements, processes, and/or devices in addition to, or instead of, those illustrated in FIG. 2, and/or may include more than one of any or all of the illustrated elements, processes, and devices.

Figure 6:
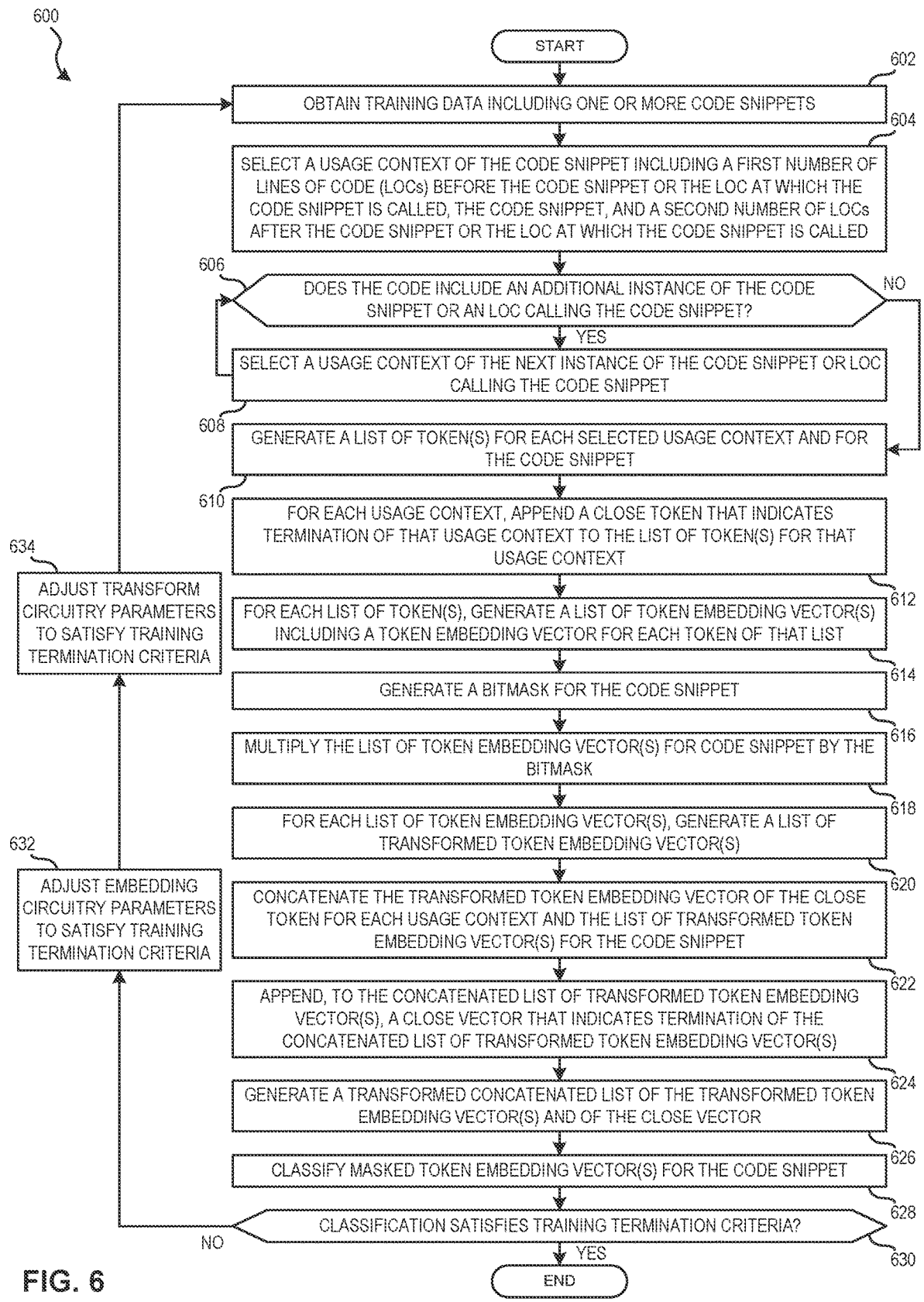
FIG. 6 is a flowchart representative of example machine-readable instructions and/or example operations that may be executed and/or instantiated by example processor circuitry to implement the code embedding circuitry of FIGS. 1 and/or 2 to perform training.
Figure 7:
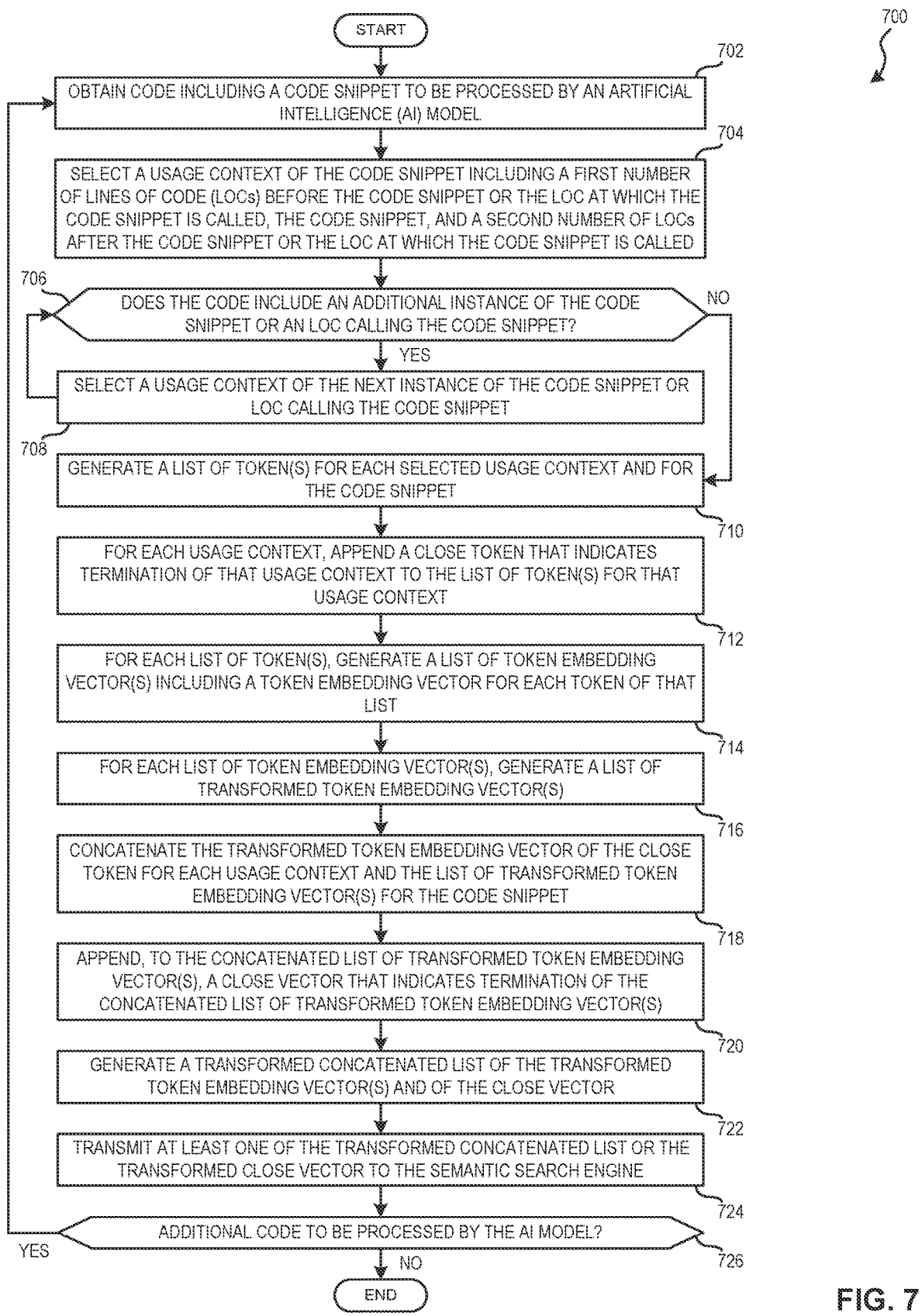
FIG. 7 is a flowchart representative of example machine-readable instructions and/or example operations that may be executed and/or instantiated by example processor circuitry to implement the code embedding circuitry of FIGS. 1 and/or 2 to generate usage dependent code embeddings.

Flowcharts representative of example hardware logic circuitry, machine-readable instructions, hardware implemented state machines, and/or any combination thereof for implementing the code embedding circuitry 104 of FIGS. 1 and/or 2 are shown in FIGS. 6 and 7. The machine-readable instructions may be one or more executable and/or instantiate-able programs or portion(s) of an executable and/or instantiate-able program for execution and/or instantiation by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random-Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed and/or instantiated by one or more hardware devices other than the processor circuitry and/or embodied in firmware or dedicated hardware. The machine-readable instructions may be distributed across multiple hardware devices and/or executed and/or instantiated by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6 and/or 7, many other methods of implementing the example code embedding circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable and/or an instantiate-able format, a packaged format, etc. Machine-readable instructions as described herein may be stored as data or a data structure (e.g., as portions of instructions, code, representations of code, etc.) that may be utilized to create, manufacture, and/or produce machine executable and/or instantiate-able instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable and/or instantiate-able by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute and/or instantiate the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed and/or instantiated in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6 and/or 7 may be implemented using executable and/or instantiate-able instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine-readable instructions and/or example operations 600 that may be executed and/or instantiated by example processor circuitry to implement the code embedding circuitry 104 of FIGS. 1 and/or 2 to perform training. The machine-readable instructions and/or the operations 600 of FIG. 6 begin at block 602, at which the parsing circuitry 202 obtains training data including one or more code snippets. For example, at block 602, the parsing circuitry 202 obtains training data including one or more code snippets from the VCS 112 via the network 108. In some examples, interface circuitry of the service provider 102 obtains training data including one or more code snippets.

In the illustrated example of FIG. 6, at block 604, the parsing circuitry 202 selects a usage context of a code snippet where the usage context includes a first number of LOCs before the code snippet or the LOC at which the code snippet is called, the code snippet, and a second number of LOCs after the code snippet or the LOC at which the code snippet is called. At block 606, the parsing circuitry 202 determines whether the code (e.g., the training data) includes an additional instance of the code snippet or an additional LOC calling the code snippet (e.g., in the case of a code snippet that is a function body). In response to the parsing circuitry 202 determining that the code includes an additional instance of the code snippet or an additional LOC calling the code snippet (block 606: YES), the machine-readable instructions and/or operation 600 proceed to block 608. At block 608, the parsing circuitry 202 selects a usage context of the next instance of the code snippet or the next LOC calling the code snippet (e.g., a function). For example, the usage context selected by the parsing circuitry 202 at block 608 includes a first number of LOCs before the next instance of the code snippet or the next LOC calling the code snippet (e.g., a function), the next instance of the code snippet or the next LOC calling the code snippet (e.g., a function), and a second number of LOCs after the next instance of the code snippet or the next LOC calling the code snippet (e.g., a function).

Returning to block 606, in response to the parsing circuitry 202 determining that the code does not include an additional instance of the code snippet or an additional LOC calling the code snippet (block 606: NO), the machine-readable instructions and/or operation 600 proceed to block 610. At block 610, the embedding circuitry 204 generates a list of one or more tokens for the selected usage contexts and for the code snippet. At block 612, for the usage contexts, the embedding circuitry 204 appends a close token (cls) that indicates termination of that usage context to the list of one or more tokens for that usage context.

In the illustrated example of FIG. 6, at block 614, the embedding circuitry 204 generates a list of one or more token embedding vectors for the lists of one or more tokens where the lists of one or more token embedding vector includes a token embedding vector for the tokens of that list of one or more tokens. At block 616, the mask generation circuitry 210 generates a bitmask for the code snippet. For example, the bitmask includes a random combination of ones and zeros including at least one zero. At block 618, the mask generation circuitry 210 multiplies the list of one or more token embedding vectors for the code snippet by the bitmask.

In the illustrated example of FIG. 6, at block 620, the transform circuitry 206 generates a list of one or more transformed token embedding vectors for lists of one or more token embedding vectors. At block 622, the concatenation circuitry 208 concatenates the transformed token embedding vector of the close token for the usage contexts and the list of one or more transformed token embedding vectors for the code snippet. At block 624, the concatenation circuitry 208 appends, to the concatenated list of one or more transformed token embedding vectors, a close vector that indicates termination of the concatenated list of one or more transformed token embedding vectors.

In the illustrated example of FIG. 6, at block 626, the transform circuitry 206 generates a transformed concatenated list of the one or more transformed token embedding vectors and of the close vector. At block 628, the classifier circuitry 212 classifies the one or more masked token embedding vectors for the code snippet. In the example of FIG. 6, at block 630, the embedding circuitry 204 determines whether the classification satisfies training termination criteria. The classifier circuitry 212 produces a probability distribution over all possible tokens (e.g., a vector with positive entries with a sum that is equal to one and a size that is the number of possible tokens). The loss function for each masked token is the distance between the predicted probability vector for that masked token and the ideal probability vector that assigns a probability of one (1) to the correct token and zero (0) to all other tokens. The total loss function is the sum of the loss functions of all masked tokens. The goal of training is to minimize this total loss in order to encourage the model to assign the highest probability (e.g., a probability of one (1)) to the correct tokens and the lowest probability (e.g., a probability of zero (0)) to the incorrect tokens. Training can be achieved by using backpropagation techniques to adjust parameters in the embedding circuitry 204 and/or the transform circuitry 206 to minimize the total loss. Training proceeds until the total loss becomes lower than a threshold and/or until the total loss stops decreasing. In response to the embedding circuitry 204 determining that the classification does not satisfy the training termination criteria (block 630: NO), the machine-readable instructions and/or the operations 600 proceed to block 632.

In the illustrated example of FIG. 6, at block 632, the embedding circuitry 204 adjusts parameters of the embedding circuitry 204 to satisfy the training termination criteria. At block 634, the transform circuitry 206 adjusts parameters of the transform circuitry 206 to satisfy the training termination criteria. In some example, central training control circuitry adjusts the parameters of the embedding circuitry 204 and/or the transform circuitry 206 to satisfy the training termination criteria. Returning to block 630, in response to the embedding circuitry 204 determining that the classification satisfies the training termination criteria (block 630: YES), the machine-readable instructions and/or the operations 600 terminate and the code embedding circuitry 104 is ready for deployment.

FIG. 7 is a flowchart representative of example machine-readable instructions and/or example operations that may be executed and/or instantiated by example processor circuitry to implement the code embedding circuitry 104 of FIGS. 1 and/or 2 to generate usage dependent code embeddings. The machine-readable instructions and/or the operations 700 of FIG. 7 begin at block 702, at which the parsing circuitry 202 obtains code including a code snippet to be processed by an artificial intelligence model. For example, at block 702, the parsing circuitry 202 obtains code including a code snippet to be processed by an artificial intelligence model from the VCS 112 via the network 108. In some examples, interface circuitry of the service provider 102 obtains code including a code snippet to be processed by an artificial intelligence model.

In the illustrated example of FIG. 7, at block 704, the parsing circuitry 202 selects a usage context of a code snippet where the usage context includes a first number of LOCs before the code snippet or the LOC at which the code snippet is called, the code snippet, and a second number of LOCs after the code snippet or the LOC at which the code snippet is called. In the example of FIG. 7, at block 706, the parsing circuitry 202 determines whether the code includes an additional instance of the code snippet or an additional LOC calling the code snippet (e.g., in the case of a code snippet that is a function body). In the example of FIG. 7, in response to the parsing circuitry 202 determining that the code includes an additional instance of the code snippet or an additional LOC calling the code snippet (block 706: YES), the machine-readable instructions and/or operations 700 proceed to block 708. At block 708, the parsing circuitry 202 selects a usage context of the next instance of the code snippet or the next LOC calling the code snippet (e.g., a function). For example, the usage context selected by the parsing circuitry 202 at block 708 includes a first number of LOCs before the next instance of the code snippet or the next LOC calling the code snippet (e.g., function), the next instance of the code snippet or the next LOC calling the code snippet (e.g., a function), and a second number of LOCs after the next instance of the code snippet or the next LOC calling the code snippet (e.g., a function).

Returning to block 706, in response to the parsing circuitry 202 determining that the code does not include an additional instance of the code snippet or an additional LOC calling the code snippet (block 706: NO), the machine-readable instructions and/or operations 700 proceed to block 710. At block 710, the embedding circuitry 204 generates a list of one or more tokens for the selected usage contexts and for the code snippet. At block 712, for individual usage contexts, the embedding circuitry 204 appends a close token (cls) that indicates termination of that usage context to the list of one or more tokens for that usage context.

In the illustrated example of FIG. 7, at block 714, the embedding circuitry 204 generates a list of one or more token embedding vectors for individual lists of one or more tokens where a list of one or more token embedding vector includes a token embedding vector for individual tokens of that list of one or more tokens. At block 716, the transform circuitry 206 generates a list of one or more transformed token embedding vectors for individual lists of one or more token embedding vectors. At block 718, the concatenation circuitry 208 concatenates the transformed token embedding vector of the close token for individual usage contexts and the list of one or more transformed token embedding vectors for the code snippet. At block 720, the concatenation circuitry 208 appends, to the concatenated list of one or more transformed token embedding vectors, a close vector that indicates termination of the concatenated list of one or more transformed token embedding vectors.

In the illustrated example of FIG. 7, at block 722, the transform circuitry 206 generates a transformed concatenated list of the one or more transformed token embedding vectors and of the close vector. At block 724, the transform circuitry 206 transmits at least one of the transformed concatenated list of the one or more transformed token embedding vectors or the transformed close vector to the semantic search engine 106. In the example of FIG. 7, at block 726, the parsing circuitry 202 determines whether there is additional code to be processed by the AI model. In response to the parsing circuitry 202 determining that there is additional code to be processed by the AI model (block 726: YES), the machine-readable instructions and/or the operations 700 return to block 702. In response to the parsing circuitry 202 determining that there is not additional code to be processed by the AI model (block 726: NO), the machine-readable instructions and/or the operations 700 terminate.

Figure 8:
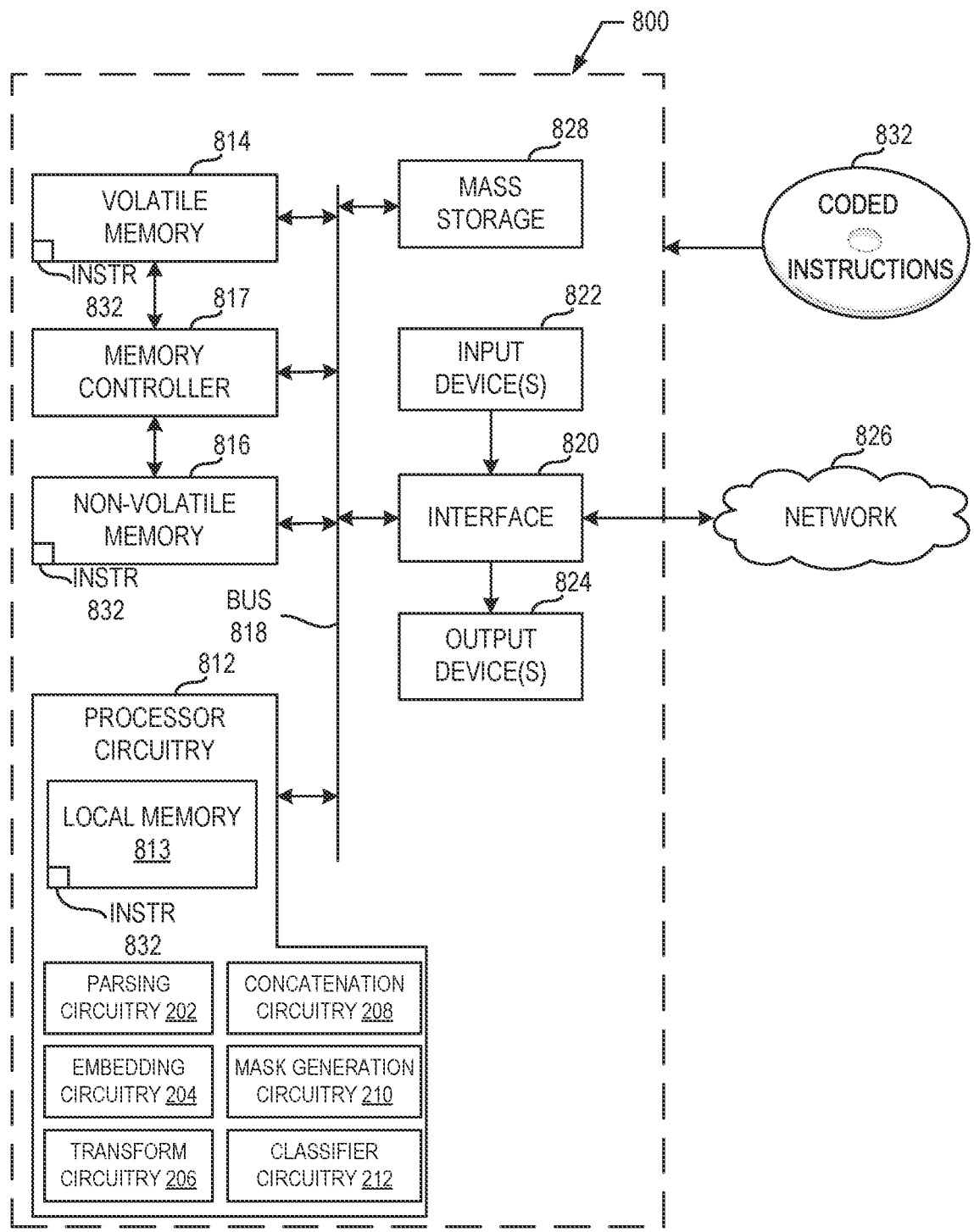
FIG. 8 is a block diagram of an example processing platform including processor circuitry structured to execute and/or instantiate the example machine-readable instructions and/or the example operations of FIGS. 6 and/or 7 to implement the code embedding circuitry of FIGS. 1 and/or 2.

FIG. 8 is a block diagram of an example processor platform 800 structured to execute and/or instantiate the machine-readable instructions and/or the operations of FIGS. 6 and/or 7 to implement the code embedding circuitry 104 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example parsing circuitry 202, the example embedding circuitry 204, the example transform circuitry 206, the example concatenation circuitry 208, the example mask generation circuitry 210, the example classifier circuitry 212, and/or, more generally, the example code embedding circuitry 104 of FIG. 1.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random-Access Memory (SDRAM), Dynamic Random-Access Memory (DRAM), RAMBUS® Dynamic Random-Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 832, which may be implemented by the machine-readable instructions of FIGS. 6 and/or 7, may be stored in the mass storage device 828, in the volatile memory 814, in the non-volatile memory 816, and/or on a removable non-transitory computer readable storage medium such as a CD or DVD.

Figure 9:
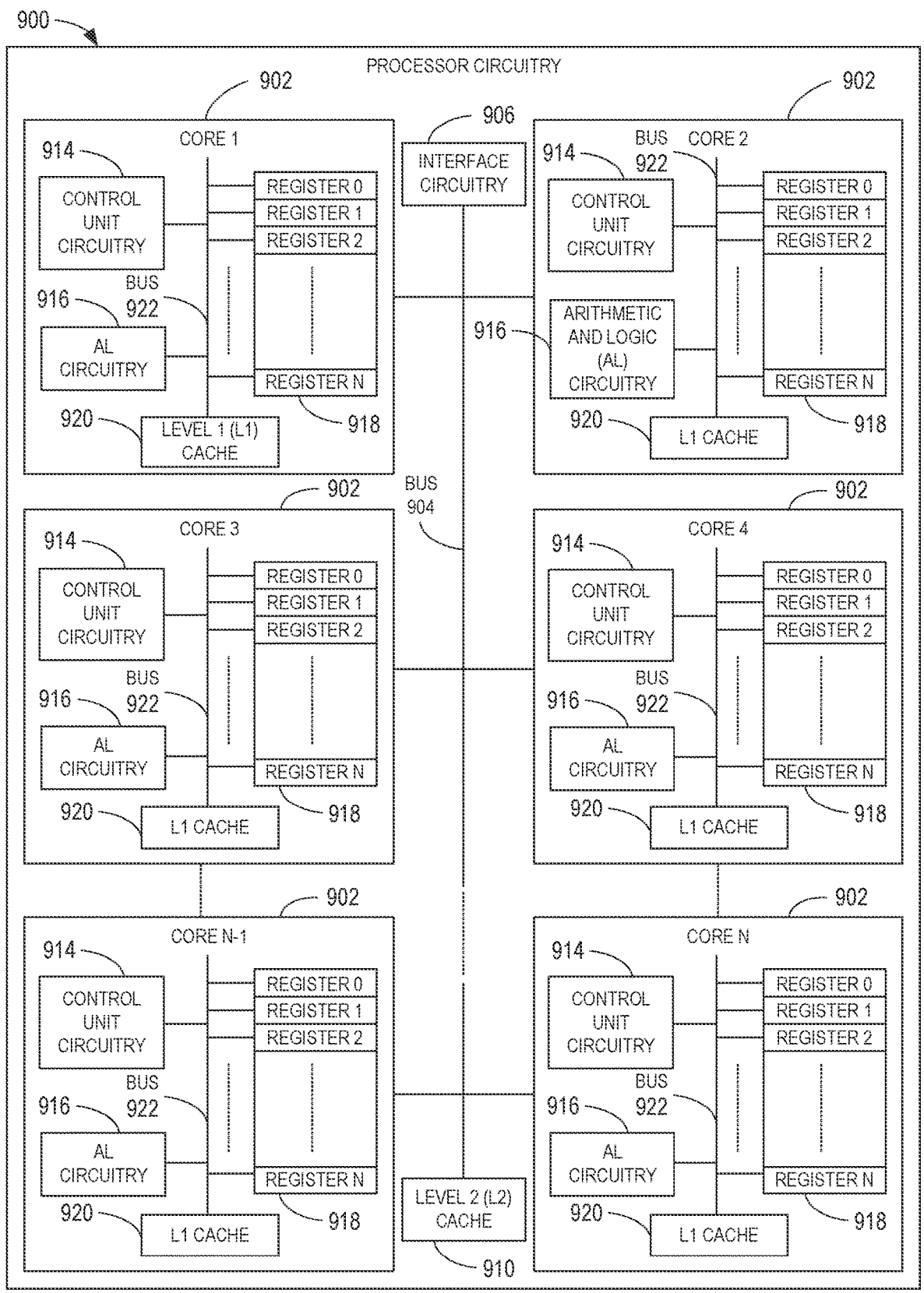
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a general purpose microprocessor circuitry 900. The general purpose microprocessor circuitry 900 executes some or all of the machine-readable instructions of the flowcharts of FIGS. 6 and/or 7 to effectively instantiate the circuitry of FIG. 2 as logic circuits to perform the operations corresponding to those machine-readable instructions (e.g., corresponding to instructions). In some such examples, the circuitry of FIG. 2 is instantiated by the hardware circuits of the microprocessor circuitry 900 in combination with the instructions. For example, the microprocessor circuitry 900 may implement multi-core hardware circuitry such as a CPU, a DSP, a GPU, an XPU, etc. Although it may include any number of example cores 902 (e.g., 1 core), the microprocessor circuitry 900 of this example is a multi-core semiconductor device including N cores. The cores 902 of the microprocessor circuitry 900 may operate independently or may cooperate to execute machine-readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine-readable instructions and/or operations represented by the flowcharts of FIGS. 6 and/or 7.

The cores 902 may communicate by a first example bus 904. In some examples, the first bus 904 may implement a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor circuitry 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry 916 (sometimes referred to as an ALU circuitry), a plurality of registers 918, the L1 cache 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control data movement (e.g., coordinate data movement) within the corresponding core 902. In some examples, the control unit circuitry 914 is referred to as control circuitry. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus Each core 902 and/or, more generally, the microprocessor circuitry 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor circuitry 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
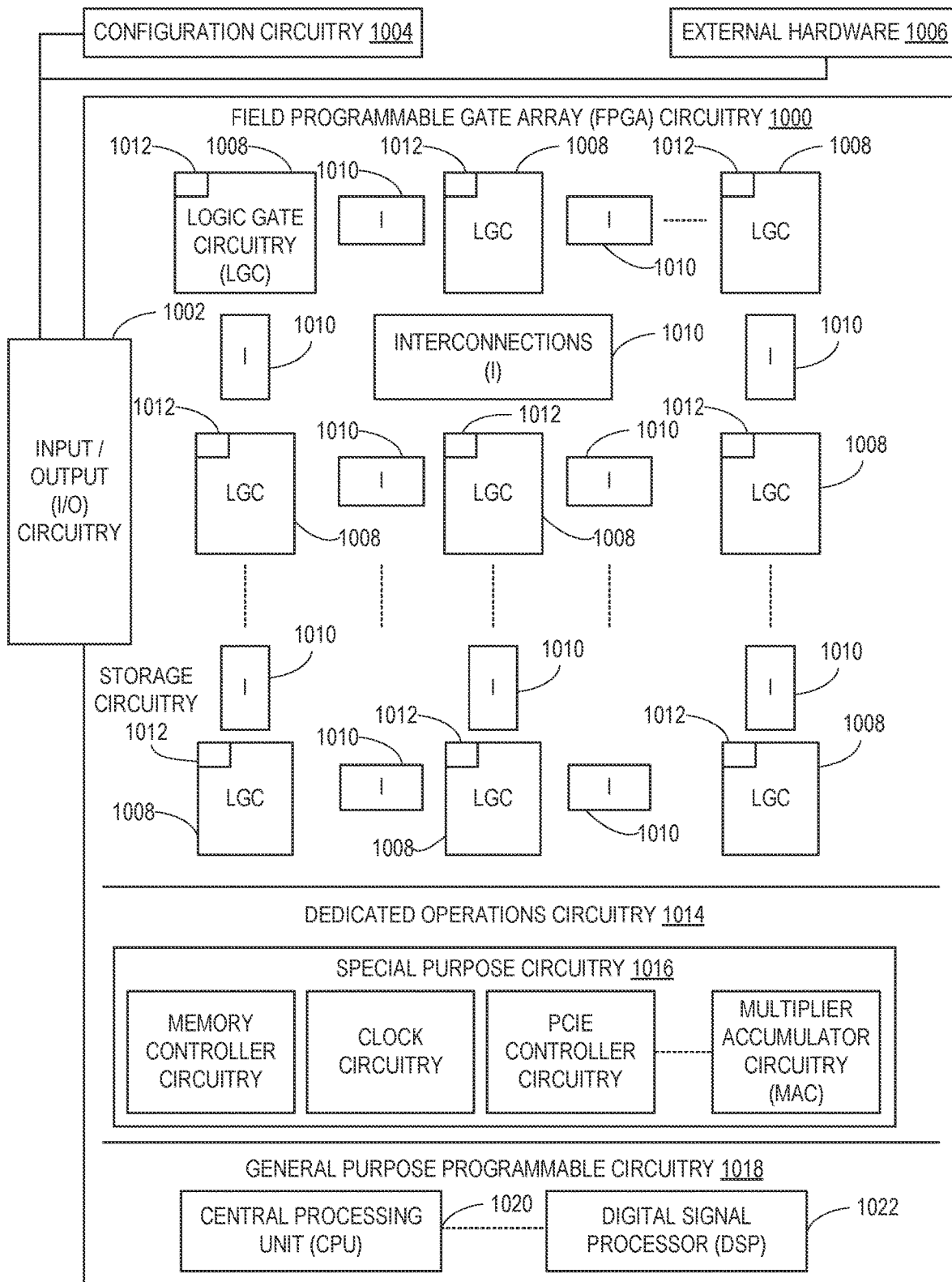
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor circuitry 900 of FIG. 9 executing corresponding machine-readable instructions. However, once configured, the FPGA circuitry 1000 instantiates the machine-readable instructions in hardware and, thus, can often execute the operations faster than they could be performed by a general purpose microprocessor executing the corresponding software.

More specifically, in contrast to the microprocessor circuitry 900 of FIG. 9 described above (which is a general purpose device that may be programmed to execute some or all of the machine-readable instructions represented by the flowcharts of FIGS. 6 and/or 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine-readable instructions represented by the flowcharts of FIGS. 6 and/or 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6 and/or 7. As such, the FPGA circuitry 1000 may be structured to effectively instantiate some or all of the machine-readable instructions of the flowcharts of FIGS. 6 and/or 7 as dedicated logic circuits to perform the operations corresponding to those software instructions in a dedicated manner analogous to an ASIC. Therefore, the FPGA circuitry 1000 may perform the operations corresponding to the some or all of the machine-readable instructions of FIGS. 6 and/or 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine-readable instructions to configure the FPGA circuitry 1000, or portion(s) thereof. In some such examples, the configuration circuitry 1004 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor circuitry 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine-readable instructions of FIGS. 6 and/or 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an onboard CPU, such as one or more of the example CPU 1020 of FIG. 10. Therefore, the processor circuitry 812 of FIG. 8 may additionally be implemented by combining the example microprocessor circuitry 900 of FIG. 9 and the example FPGA circuitry 1000 of FIG. 10. In some such hybrid examples, a first portion of the machine-readable instructions represented by the flowcharts of FIGS. 6 and/or 7 may be executed by one or more of the cores 902 of FIG. 9, a second portion of the machine-readable instructions represented by the flowcharts of FIGS. 6 and/or 7 may be executed by the FPGA circuitry 1000 of FIG. 10, and/or a third portion of the machine-readable instructions represented by the flowcharts of FIGS. 6 and/or 7 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 812 of FIG. 8 may be in one or more packages. For example, the microprocessor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
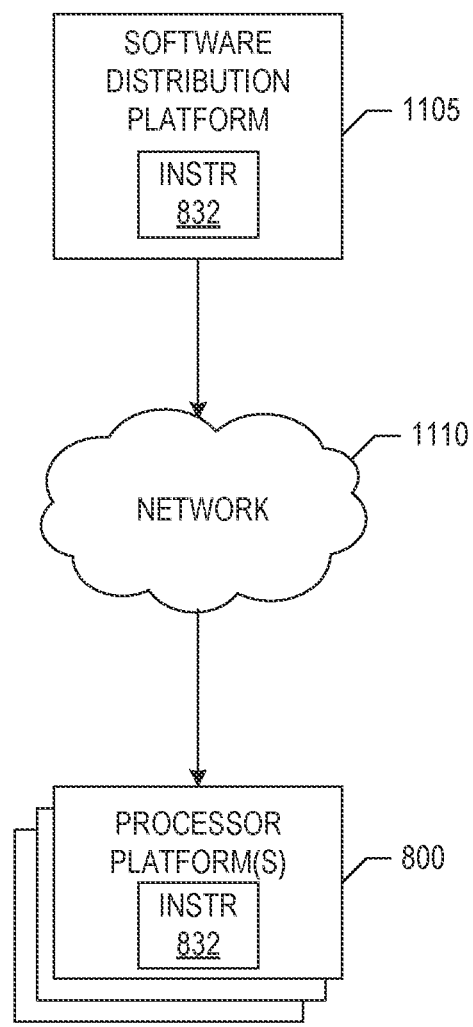
FIG. 11 is a block diagram of an example software distribution platform (e.g., one or more servers) to distribute software (e.g., software corresponding to the example machine-readable instructions of FIGS. 6 and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine-readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine-readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine-readable instructions 832, which may correspond to the example machine-readable instructions and/or operations 600 of FIG. 6 and/or the example machine-readable instructions and/or operations 700 of FIG. 7, as described above. The one or more servers of the example software distribution platform 1105 are in communication with a network 1110, which may correspond to any one or more of the Internet and/or any of the example network 108 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 832 from the software distribution platform 1105. For example, the software, which may correspond to the example machine-readable instructions and/or operations 600 of FIG. 6 and/or the example machine-readable instructions and/or operations 700 of FIG. 7, may be downloaded to the example processor platform 800, which is to execute the machine-readable instructions 832 to implement the code embedding circuitry 104. In some example, one or more servers of the software distribution platform 1105 periodically offer, transmit, and/or force updates to the software (e.g., the example machine-readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that generate usage dependent code embeddings. AI models implementing code intelligence tasks are beginning to play a more significant role in increasing programmer productivity and improving code quality. AI-driven code assistance tools are gaining wide adoption and a large range of code intelligence tools depend on having high quality code embeddings. Accordingly, by improving code embedding quality, examples disclosed herein improve performance of a wide range of code intelligence tools.

Capturing semantic intent of an input code snippet is relevant for downstream tasks such as code repair because such intent informs processor circuitry executing downstream tasks information such as programmer intent. Accordingly, because examples disclosed herein improve code embedding quality by capturing information about programmer intent, examples disclosed herein provide downstream tasks with strong indicators of a programmer's intent and what he/she thinks a code snippet should do. By leveraging this information, examples disclosed herein increase the chance of generating embeddings that accurately capture a programmer's intent.

As described above, code embedding quality plays a large role in the success of many code intelligence tasks. High quality embeddings disclosed herein go beyond capturing syntactic properties of the code and encode high level semantic information about code function. Disclosed methods, apparatus, and articles of manufacture include an embedding generation technique that provides additional sources of code-related information that is not captured by existing techniques. For example, examples disclosed herein capture code usage context. Example methods, apparatus, and article of manufactures disclosed herein consider not only the code body but also code usage scenarios to generate more informative embeddings. As such, disclosed systems, methods, apparatus, and articles of manufacture improve the efficiency of using a computing device by improving performance of downstream code intelligence networks. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to generate usage dependent code embeddings are disclosed herein. Further examples and combinations thereof include the following:

Example 1 includes an apparatus to generate usage dependent code embeddings, the apparatus comprising interface circuitry to obtain code including a code snippet to be processed by an artificial intelligence (AI) model, and processor circuitry including one or more of at least one of a central processor unit (CPU), a graphics processor unit (GPU), or a digital signal processor (DSP), the at least one of the CPU, the GPU, or the DSP having control circuitry to control data movement within the processor circuitry, arithmetic and first logic circuitry to perform one or more first operations corresponding to instructions, and one or more registers to store a first result of the one or more first operations, the instructions in the apparatus, Field Programmable Gate Array (FPGA) circuitry, the FPGA circuitry including second logic gate circuitry, a plurality of configurable interconnections, and storage circuitry, the second logic gate circuitry and interconnections to perform one or more second operations, the storage circuitry to store a second result of the one or more second operations, or Application Specific Integrated Circuitry (ASIC) including third logic gate circuitry to perform one or more third operations, the processor circuitry to perform at least one of the first operations, the second operations, or the third operations to instantiate parsing circuitry to select a usage context of the code snippet including at least one line of code (LOC) before the code snippet or an LOC at which the code snippet is called, the code snippet, and at least one LOC after the code snippet or the LOC at which the code snippet is called, embedding circuitry to generate a first list of one or more token embedding vectors for first tokens of a second list of one or more tokens for the code snippet and a third list of one or more token embedding vectors for second tokens of a fourth list of one or more tokens for the usage context, the fourth list including a close token, and concatenation circuitry to concatenate a transformed token embedding vector of the close token and a fifth list of one or more transformed token embedding vectors for the first list of one or more token embedding vectors.

Example 2 includes the apparatus of example 1, wherein the processor circuitry is to perform at least one of the first operations, the second operations, or the third operations to instantiate the concatenation circuitry to prepend the transformed token embedding vector of the close token to the fifth list of one or more transformed token embedding vectors.

Example 3 includes the apparatus of any of examples 1 or 2, wherein the processor circuitry is to perform at least one of the first operations, the second operations, or the third operations to instantiate transform circuitry to generate the fifth list of one or more transformed token embedding vectors for the first list of one or more token embedding vectors and a sixth list of one or more transformed token embedding vectors for the third list of one or more token embedding vectors.

Example 4 includes the apparatus of any of examples 1, 2, or 3, wherein the processor circuitry is first processor circuitry, and the first processor circuitry is to perform at least one of the first operations, the second operations, or the third operations to instantiate the concatenation circuitry to append a close vector to a concatenated list of the transformed token embedding vector of the close token and the fifth list of one or more transformed token embedding vectors, and transform circuitry to generate a transformed concatenated list of the transformed token embedding vector of the close token, the fifth list of one or more transformed token embedding vectors, and the close vector, and transmit at least one of the transformed concatenated list or a transformed close vector to second processor circuitry implementing the AI model.

Example 5 includes the apparatus of any of examples 1, 2, 3, or 4, wherein at least one of the at least one LOC before the code snippet or the LOC at which the code snippet is called or the at least one LOC after the code snippet or the LOC at which the code snippet is called provides the AI model with information about the code snippet to be processed including information about arguments of the code snippet, information about how an output of the code snippet is used, or information about a programming context in which the code snippet is used.

Example 6 includes the apparatus of any of examples 1, 2, 3, 4, or 5, wherein the at least one LOC before the code snippet or the LOC at which the code snippet is called and the at least one LOC after the code snippet or the LOC at which the code snippet is called correspond to a threshold number of LOCs.

Example 7 includes the apparatus of any of examples 1, 2, 3, 4, or 5, wherein the at least one of LOC before the code snippet or the LOC at which the code snippet is called corresponds to a first threshold number of LOCs and the at least one LOC after the code snippet or the LOC at which the code snippet is called corresponds to a second threshold number of LOCs different from the first threshold number of LOCs.

Example 8 includes a non-transitory computer readable medium comprising machine-readable instructions which, when executed, cause processor circuitry to obtain code including a code snippet to be processed by an artificial intelligence (AI) model, select a usage context of the code snippet including at least one line of code (LOC) before the code snippet or an LOC at which the code snippet is called, the code snippet, and at least one LOC after the code snippet or the LOC at which the code snippet is called, generate a first list of one or more token embedding vectors for first tokens of a second list of one or more tokens for the code snippet and a third list of one or more token embedding vectors for second tokens of a fourth list of one or more tokens for the usage context, the fourth list including a close token, and concatenate a transformed token embedding vector of the close token and a fifth list of one or more transformed token embedding vectors for the first list of one or more token embedding vectors.

Example 9 includes the non-transitory computer readable medium of example 8, wherein the instructions cause the processor circuitry to prepend the transformed token embedding vector of the close token to the fifth list of one or more transformed token embedding vectors.

Example 10 includes the non-transitory computer readable medium of any of examples 8 or 9, wherein the instructions cause the processor circuitry to generate the fifth list of one or more transformed token embedding vectors for the first list of one or more token embedding vectors and a sixth list of one or more transformed token embedding vectors for the third list of one or more token embedding vectors.

Example 11 includes the non-transitory computer readable medium of any of examples 8, 9, or 10, wherein the processor circuitry is first processor circuitry, and the instructions cause the first processor circuitry to append a close vector to a concatenated list of the transformed token embedding vector of the close token and the fifth list of one or more transformed token embedding vectors, generate a transformed concatenated list of the transformed token embedding vector of the close token, the fifth list of one or more transformed token embedding vectors, and the close vector, and transmit at least one of the transformed concatenated list or a transformed close vector to second processor circuitry implementing the AI model.

Example 12 includes the non-transitory computer readable medium of any of examples 8, 9, 10, or 11, wherein at least one of the at least one LOC before the code snippet or the LOC at which the code snippet is called or the at least one LOC after the code snippet or the LOC at which the code snippet is called provides the AI model with information about the code snippet to be processed including information about arguments of the code snippet, information about how an output of the code snippet is used, or information about a programming context in which the code snippet is used.

Example 13 includes the non-transitory computer readable medium of any of examples 8, 9, 10, 11, or 12, wherein the at least one LOC before the code snippet or the LOC at which the code snippet is called and the at least one LOC after the code snippet or the LOC at which the code snippet is called correspond to a threshold number of LOCs.

Example 14 includes the non-transitory computer readable medium of any of examples 8, 9, 10, 11, or 12, wherein the at least one of LOC before the code snippet or the LOC at which the code snippet is called corresponds to a first threshold number of LOCs and the at least one LOC after the code snippet or the LOC at which the code snippet is called corresponds to a second threshold number of LOCs different from the first threshold number of LOCs.

Example 15 includes an apparatus to generate usage dependent code embeddings, the apparatus comprising at least one memory, instructions, processor circuitry to execute the instructions to at least obtain code including a code snippet to be processed by an artificial intelligence (AI) model, select a usage context of the code snippet including at least one line of code (LOC) before the code snippet or the LOC at which the code snippet is called, the code snippet, and at least one LOC after the code snippet or the LOC at which the code snippet is called, generate a first list of one or more token embedding vectors for first tokens of a second list of one or more tokens for the code snippet and a third list of one or more token embedding vectors for second tokens of a fourth list of one or more tokens for the usage context, the fourth list including a close token, and concatenate a transformed token embedding vector of the close token and a fifth list of one or more transformed token embedding vectors for the first list of one or more token embedding vectors.

Example 16 includes the apparatus of example 15, wherein the processor circuitry executes the instructions to prepend the transformed token embedding vector of the close token to the fifth list of one or more transformed token embedding vectors.

Example 17 includes the apparatus of any of examples 15 or 16, wherein the processor circuitry executes the instructions to generate the fifth list of one or more transformed token embedding vectors for the first list of one or more token embedding vectors and a sixth list of one or more transformed token embedding vectors for the third list of one or more token embedding vectors.

Example 18 includes the apparatus of any of examples 15, 16, or 17, wherein the processor circuitry is first processor circuitry, and the first processor circuitry executes the instructions to append a close vector to a concatenated list of the transformed token embedding vector of the close token and the fifth list of one or more transformed token embedding vectors, generate a transformed concatenated list of the transformed token embedding vector of the close token, the fifth list of one or more transformed token embedding vectors, and the close vector, and transmit at least one of the transformed concatenated list or a transformed close vector to second processor circuitry implementing the AI model.

Example 19 includes the apparatus of any of examples 15, 16, 17, or 18, wherein at least one of the at least one LOC before the code snippet or the LOC at which the code snippet is called or the at least one LOC after the code snippet or the LOC at which the code snippet is called provides the AI model with information about the code snippet to be processed including information about arguments of the code snippet, information about how an output of the code snippet is used, or information about a programming context in which the code snippet is used.

Example 20 includes the apparatus of any of examples 15, 16, 17, 18, or 19, wherein the at least one LOC before the code snippet or the LOC at which the code snippet is called and the at least one LOC after the code snippet or the LOC at which the code snippet is called correspond to a threshold number of LOCs.

Example 21 includes the apparatus of any of examples 15, 16, 17, 18, or 19, wherein the at least one of LOC before the code snippet or the LOC at which the code snippet is called corresponds to a first threshold number of LOCs and the at least one LOC after the code snippet or the LOC at which the code snippet is called corresponds to a second threshold number of LOCs different from the first threshold number of LOCs.

Example 22 includes a method to generate usage dependent code embeddings, the method comprising obtaining code including a code snippet to be processed by an artificial intelligence (AI) model, selecting a usage context of the code snippet including at least one line of code (LOC) before the code snippet or an LOC at which the code snippet is called, the code snippet, and at least one LOC after the code snippet or the LOC at which the code snippet is called, generating a first list of one or more token embedding vectors for first tokens of a second list of one or more tokens for the code snippet and a third list of one or more token embedding vectors for second tokens of a fourth list of one or more tokens for the usage context, the fourth list including a close token, and concatenating a transformed token embedding vector of the close token and a fifth list of one or more transformed token embedding vectors for the first list of one or more token embedding vectors.

Example 23 includes the method of example 22, further including prepending the transformed token embedding vector of the close token to the fifth list of one or more transformed token embedding vectors.

Example 24 includes the method of any of examples 22 or 23, further including generating the fifth list of one or more transformed token embedding vectors for the first list of one or more token embedding vectors and a sixth list of one or more transformed token embedding vectors for the third list of one or more token embedding vectors.

Example 25 includes the method of any of examples 22, 23, or 24, further including appending a close vector to a concatenated list of the transformed token embedding vector of the close token and the fifth list of one or more transformed token embedding vectors, generating a transformed concatenated list of the transformed token embedding vector of the close token, the fifth list of one or more transformed token embedding vectors, and the close vector, and transmitting at least one of the transformed concatenated list or a transformed close vector to processor circuitry implementing the AI model.

Example 26 includes the method of any of examples 22, 23, 24, of 25, wherein at least one of the at least one LOC before the code snippet or the LOC at which the code snippet is called or the at least one LOC after the code snippet or the LOC at which the code snippet is called provides the AI model with information about the code snippet to be processed including information about arguments of the code snippet, information about how an output of the code snippet is used, or information about a programming context in which the code snippet is used.

Example 27 includes the method of any of examples 22, 23, 24, 25, or 26, wherein the at least one LOC before the code snippet or the LOC at which the code snippet is called and the at least one LOC after the code snippet or the LOC at which the code snippet is called correspond to a threshold number of LOCs.

Example 28 includes the method of any of examples 22, 23, 24, 25, or 26, wherein the at least one of LOC before the code snippet or the LOC at which the code snippet is called corresponds to a first threshold number of LOCs and the at least one LOC after the code snippet or the LOC at which the code snippet is called corresponds to a second threshold number of LOCs different from the first threshold number of LOCs.

Example 29 includes an apparatus to generate usage dependent code embeddings, the apparatus comprising means for parsing code obtain the code which includes a code snippet to be processed by an artificial intelligence (AI) model, and select a usage context of the code snippet including at least one line of code (LOC) before the code snippet or an LOC at which the code snippet is called, the code snippet, and at least one LOC after the code snippet or the LOC at which the code snippet is called, means for embedding code to generate a first list of one or more token embedding vectors for first tokens of a second list of one or more tokens for the code snippet and a third list of one or more token embedding vectors for second tokens of a fourth list of one or more tokens for the usage context, the fourth list including a close token, and means for concatenating vectors to concatenate a transformed token embedding vector of the close token and a fifth list of one or more transformed token embedding vectors for the first list of one or more token embedding vectors.

Example 30 includes the apparatus of example 29, wherein the means for concatenating vectors is to prepend the transformed token embedding vector of the close token to the fifth list of one or more transformed token embedding vectors.

Example 31 includes the apparatus of any of examples 29, or 30 further including means for transforming vectors transform circuitry to generate the fifth list of one or more transformed token embedding vectors for the first list of one or more token embedding vectors and a sixth list of one or more transformed token embedding vectors for the third list of one or more token embedding vectors.

Example 32 includes the apparatus of any of examples 29, 30, or 31, wherein the means for concatenating vectors is to append a close vector to a concatenated list of the transformed token embedding vector of the close token and the fifth list of one or more transformed token embedding vectors, and the apparatus further includes means for transforming vectors to generate a transformed concatenated list of the transformed token embedding vector of the close token, the fifth list of one or more transformed token embedding vectors, and the close vector, and transmit at least one of the transformed concatenated list or a transformed close vector to processor circuitry implementing the AI model.

Example 33 includes the apparatus of any of examples 29, 30, 31, or 32, wherein at least one of the at least one LOC before the code snippet or the LOC at which the code snippet is called or the at least one LOC after the code snippet or the LOC at which the code snippet is called provides the AI model with information about the code snippet to be processed including information about arguments of the code snippet, information about how an output of the code snippet is used, or information about a programming context in which the code snippet is used.

Example 34 includes the apparatus of any of examples 29, 30, 31, 32, or 33, wherein the at least one LOC before the code snippet or the LOC at which the code snippet is called and the at least one LOC after the code snippet or the LOC at which the code snippet is called correspond to a threshold number of LOCs.

Example 35 includes the apparatus of any of examples 29, 30, 31, 32, or 33, wherein the at least one of LOC before the code snippet or the LOC at which the code snippet is called corresponds to a first threshold number of LOCs and the at least one LOC after the code snippet or the LOC at which the code snippet is called corresponds to a second threshold number of LOCs different from the first threshold number of LOCs.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to generate usage dependent code embeddings, the apparatus comprising:
    interface circuitry to obtain code including a code snippet to be processed by an artificial intelligence (AI) model; and
    processor circuitry including one or more of:
        at least one of a central processor unit (CPU), a graphics processor unit (GPU), or a digital signal processor (DSP), the at least one of the CPU, the GPU, or the DSP having control circuitry to control data movement within the processor circuitry, arithmetic and first logic circuitry to perform one or more first operations corresponding to instructions, and one or more registers to store a first result of the one or more first operations, the instructions in the apparatus;
        Field Programmable Gate Array (FPGA) circuitry, the FPGA circuitry including second logic gate circuitry, a plurality of configurable interconnections, and storage circuitry, the second logic gate circuitry and interconnections to perform one or more second operations, the storage circuitry to store a second result of the one or more second operations; or
        Application Specific Integrated Circuitry (ASIC) including third logic gate circuitry to perform one or more third operations;
    the processor circuitry to perform at least one of the first operations, the second operations, or the third operations to instantiate:
        parsing circuitry to select a usage context of the code snippet including at least one line of code (LOC) before the code snippet or an LOC at which the code snippet is called, the code snippet, and at least one LOC after the code snippet or the LOC at which the code snippet is called;
        embedding circuitry to generate a first list of one or more token embedding vectors for first tokens of a second list of one or more tokens for the code snippet and a third list of one or more token embedding vectors for second tokens of a fourth list of one or more tokens for the usage context, the fourth list including a close token; and
        concatenation circuitry to concatenate a transformed token embedding vector of the close token and a fifth list of one or more transformed token embedding vectors for the first list of one or more token embedding vectors.

2. The apparatus of claim 1, wherein the processor circuitry is to perform at least one of the first operations, the second operations, or the third operations to instantiate the concatenation circuitry to prepend the transformed token embedding vector of the close token to the fifth list of one or more transformed token embedding vectors.

3. The apparatus of claim 1, wherein the processor circuitry is to perform at least one of the first operations, the second operations, or the third operations to instantiate transform circuitry to generate the fifth list of one or more transformed token embedding vectors for the first list of one or more token embedding vectors and a sixth list of one or more transformed token embedding vectors for the third list of one or more token embedding vectors.

4. The apparatus of claim 1, wherein the processor circuitry is first processor circuitry, and the first processor circuitry is to perform at least one of the first operations, the second operations, or the third operations to instantiate:
    the concatenation circuitry to append a close vector to a concatenated list of the transformed token embedding vector of the close token and the fifth list of one or more transformed token embedding vectors; and
    transform circuitry to:
        generate a transformed concatenated list of the transformed token embedding vector of the close token, the fifth list of one or more transformed token embedding vectors, and the close vector; and
        transmit at least one of the transformed concatenated list or a transformed close vector to second processor circuitry implementing the AI model.

5. The apparatus of claim 1, wherein at least one of the at least one LOC before the code snippet or the LOC at which the code snippet is called or the at least one LOC after the code snippet or the LOC at which the code snippet is called provides the AI model with information about the code snippet to be processed including information about arguments of the code snippet, information about how an output of the code snippet is used, or information about a programming context in which the code snippet is used.

6. The apparatus of claim 1, wherein the at least one LOC before the code snippet or the LOC at which the code snippet is called and the at least one LOC after the code snippet or the LOC at which the code snippet is called correspond to a threshold number of LOCs.

7. The apparatus of claim 1, wherein the at least one of LOC before the code snippet or the LOC at which the code snippet is called corresponds to a first threshold number of LOCs and the at least one LOC after the code snippet or the LOC at which the code snippet is called corresponds to a second threshold number of LOCs different from the first threshold number of LOCs.

8. A non-transitory computer readable medium comprising machine-readable instructions which, when executed, cause processor circuitry to:
    obtain code including a code snippet to be processed by an artificial intelligence (AI) model;
    select a usage context of the code snippet including at least one line of code (LOC) before the code snippet or an LOC at which the code snippet is called, the code snippet, and at least one LOC after the code snippet or the LOC at which the code snippet is called;

generate a first list of one or more token embedding vectors for first tokens of a second list of one or more tokens for the code snippet and a third list of one or more token embedding vectors for second tokens of a fourth list of one or more tokens for the usage context, the fourth list including a close token; and concatenate a transformed token embedding vector of the close token and a fifth list of one or more transformed token embedding vectors for the first list of one or more token embedding vectors.

9. The non-transitory computer readable medium of claim 8, wherein the instructions cause the processor circuitry to prepend the transformed token embedding vector of the close token to the fifth list of one or more transformed token embedding vectors.

10. The non-transitory computer readable medium of claim 8, wherein the instructions cause the processor circuitry to generate the fifth list of one or more transformed token embedding vectors for the first list of one or more token embedding vectors and a sixth list of one or more transformed token embedding vectors for the third list of one or more token embedding vectors.

11. The non-transitory computer readable medium of claim 8, wherein the processor circuitry is first processor circuitry, and the instructions cause the first processor circuitry to:

append a close vector to a concatenated list of the transformed token embedding vector of the close token and the fifth list of one or more transformed token embedding vectors;

generate a transformed concatenated list of the transformed token embedding vector of the close token, the fifth list of one or more transformed token embedding vectors, and the close vector; and transmit at least one of the transformed concatenated list or a transformed close vector to second processor circuitry implementing the AI model.

12. The non-transitory computer readable medium of claim 8, wherein at least one of the at least one LOC before the code snippet or the LOC at which the code snippet is called or the at least one LOC after the code snippet or the LOC at which the code snippet is called provides the AI model with information about the code snippet to be processed including information about arguments of the code snippet, information about how an output of the code snippet is used, or information about a programming context in which the code snippet is used.

13. The non-transitory computer readable medium of claim 8, wherein the at least one LOC before the code snippet or the LOC at which the code snippet is called and the at least one LOC after the code snippet or the LOC at which the code snippet is called correspond to a threshold number of LOCs.

14. The non-transitory computer readable medium of claim 8, wherein the at least one of LOC before the code snippet or the LOC at which the code snippet is called corresponds to a first threshold number of LOCs and the at least one LOC after the code snippet or the LOC at which the code snippet is called corresponds to a second threshold number of LOCs different from the first threshold number of LOCs.

15. An apparatus to generate usage dependent code embeddings, the apparatus comprising:
at least one memory;
instructions;
processor circuitry to execute the instructions to at least:

obtain code including a code snippet to be processed by an artificial intelligence (AI) model;

select a usage context of the code snippet including at least one line of code (LOC) before the code snippet or the LOC at which the code snippet is called, the code snippet, and at least one LOC after the code snippet or the LOC at which the code snippet is called;

generate a first list of one or more token embedding vectors for first tokens of a second list of one or more tokens for the code snippet and a third list of one or more token embedding vectors for second tokens of a fourth list of one or more tokens for the usage context, the fourth list including a close token; and concatenate a transformed token embedding vector of the close token and a fifth list of one or more transformed token embedding vectors for the first list of one or more token embedding vectors.

16. The apparatus of claim 15, wherein the processor circuitry executes the instructions to prepend the transformed token embedding vector of the close token to the fifth list of one or more transformed token embedding vectors.

17. The apparatus of claim 15, wherein the processor circuitry executes the instructions to generate the fifth list of one or more transformed token embedding vectors for the first list of one or more token embedding vectors and a sixth list of one or more transformed token embedding vectors for the third list of one or more token embedding vectors.

18. The apparatus of claim 15, wherein the processor circuitry is first processor circuitry, and the first processor circuitry executes the instructions to:

append a close vector to a concatenated list of the transformed token embedding vector of the close token and the fifth list of one or more transformed token embedding vectors;

generate a transformed concatenated list of the transformed token embedding vector of the close token, the fifth list of one or more transformed token embedding vectors, and the close vector; and transmit at least one of the transformed concatenated list or a transformed close vector to second processor circuitry implementing the AI model.

19. The apparatus of claim 15, wherein at least one of the at least one LOC before the code snippet or the LOC at which the code snippet is called or the at least one LOC after the code snippet or the LOC at which the code snippet is called provides the AI model with information about the code snippet to be processed including information about arguments of the code snippet, information about how an output of the code snippet is used, or information about a programming context in which the code snippet is used.

20. The apparatus of claim 15, wherein the at least one LOC before the code snippet or the LOC at which the code snippet is called and the at least one LOC after the code snippet or the LOC at which the code snippet is called correspond to a threshold number of LOCs.

21. The apparatus of claim 15, wherein the at least one of LOC before the code snippet or the LOC at which the code snippet is called corresponds to a first threshold number of LOCs and the at least one LOC after the code snippet or the LOC at which the code snippet is called corresponds to a second threshold number of LOCs different from the first threshold number of LOCs.

22. A method to generate usage dependent code embeddings, the method comprising:
- obtaining code including a code snippet to be processed by an artificial intelligence (AI) model;
- selecting a usage context of the code snippet including at least one line of code (LOC) before the code snippet or an LOC at which the code snippet is called, the code snippet, and at least one LOC after the code snippet or the LOC at which the code snippet is called;
- generating a first list of one or more token embedding vectors for first tokens of a second list of one or more tokens for the code snippet and a third list of one or more token embedding vectors for second tokens of a fourth list of one or more tokens for the usage context, the fourth list including a close token; and
- concatenating a transformed token embedding vector of the close token and a fifth list of one or more transformed token embedding vectors for the first list of one or more token embedding vectors.

23. The method of claim 22, further including prepending the transformed token embedding vector of the close token to the fifth list of one or more transformed token embedding vectors.

24. The method of claim 22, further including generating the fifth list of one or more transformed token embedding vectors for the first list of one or more token embedding vectors and a sixth list of one or more transformed token embedding vectors for the third list of one or more token embedding vectors.

25. The method of claim 22, further including:
- appending a close vector to a concatenated list of the transformed token embedding vector of the close token and the fifth list of one or more transformed token embedding vectors;
- generating a transformed concatenated list of the transformed token embedding vector of the close token, the fifth list of one or more transformed token embedding vectors, and the close vector; and
- transmitting at least one of the transformed concatenated list or a transformed close vector to processor circuitry implementing the AI model.

* * * * *